(12) United States Patent
Zhi et al.

(10) Patent No.: US 11,152,619 B2
(45) Date of Patent: Oct. 19, 2021

(54) ENERGY STORAGE DEVICE AND AN ELECTRODE FOR AN ENERGY STORAGE DEVICE

(71) Applicant: City University of Hong Kong, Kowloon (HK)

(72) Inventors: Chunyi Zhi, Shatin (HK); Yuwei Zhao, Kowloon (HK); Longtao Ma, Kowloon (HK); Zijie Tang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 50 days.

(21) Appl. No.: 16/456,114

(22) Filed: Jun. 28, 2019

(65) Prior Publication Data
US 2020/0411862 A1   Dec. 31, 2020

(51) Int. Cl.
| | | |
|---|---|---|
| *H01M 4/58* | (2010.01) | |
| *H01M 4/60* | (2006.01) | |
| *H01M 4/36* | (2006.01) | |
| *H01M 10/44* | (2006.01) | |
| *H01M 4/42* | (2006.01) | |

(52) U.S. Cl.
CPC ......... *H01M 4/5815* (2013.01); *H01M 4/366* (2013.01); *H01M 4/42* (2013.01); *H01M 4/602* (2013.01); *H01M 10/44* (2013.01)

(58) Field of Classification Search
CPC ....... H01M 4/42; H01M 4/244; H01M 4/5815
See application file for complete search history.

(56) References Cited

U.S. PATENT DOCUMENTS

| | | | | |
|---|---|---|---|---|
| 6,949,318 B2* | 9/2005 | Choi | ................. | H01M 10/0565 429/303 |
| 7,194,920 B2* | 3/2007 | Welker | ..................... | G01F 1/46 73/204.21 |
| 8,663,844 B2 | 3/2014 | Kang et al. | | |
| 8,940,434 B2 | 1/2015 | Khasanov et al. | | |
| 10,084,182 B2* | 9/2018 | Pan | ........................ | H01M 4/625 |
| 10,177,381 B2* | 1/2019 | Fanous | ................ | H01M 4/622 |
| 10,580,991 B2* | 3/2020 | Bao | ..................... | H01L 51/0043 |

(Continued)

FOREIGN PATENT DOCUMENTS

| | | | |
|---|---|---|---|
| CN | 104530311 | | 4/2015 |
| CN | 110265656 A | * | 9/2019 |
| JP | 2020161308 A | * | 10/2020 |

OTHER PUBLICATIONS

Lai et al, Metal sulfide nanostructures: synthesis, properties and applications in energy conversion and storage, Journal of Materials Chemistry, 22, 19-30, 2012. (Year: 2012).*

Zhao et al, Inhibiting Grain Pulverization and Sulfur Dissolution of Bismuth Sulfide by Ionic Liquid Enhanced Poly(3,4-ethylenedioxythiophene):Poly(styrenesulfonate) for High-Performance Zinc-Ion Batteries, ACSNano, 13, 7270-7280(2019). (Year: 2019).*

(Continued)

*Primary Examiner* — Amanda C. Walke
(74) *Attorney, Agent, or Firm* — Renner, Kenner, Greive, Bobak, Taylor & Weber

(57) ABSTRACT

An electrode and an energy storage device including the electrode, the electrode including: an active material including a material structure of metal sulfides; a conductive polymer including an ionic liquid disposed on the active material; wherein the combination of the conductive polymer and the ionic liquid is arranged to maintain integrity of the material structure and facilitate ion transportation across the material structure during an operation of charging and discharging cycle of the energy storage device.

17 Claims, 36 Drawing Sheets

(56) References Cited

U.S. PATENT DOCUMENTS

| | | | | |
|---|---|---|---|---|
| 2009/0305135 | A1* | 12/2009 | Shi | H01M 4/625 |
| | | | | 429/217 |
| 2010/0124706 | A1* | 5/2010 | Hirose | H01M 4/134 |
| | | | | 429/331 |
| 2014/0205909 | A1* | 7/2014 | Yonehara | H01M 10/24 |
| | | | | 429/302 |
| 2014/0342249 | A1* | 11/2014 | He | H01M 4/581 |
| | | | | 429/403 |
| 2015/0072244 | A1* | 3/2015 | Chen | H01M 4/622 |
| | | | | 429/303 |
| 2015/0228986 | A1* | 8/2015 | Wang | H01M 4/06 |
| | | | | 429/118 |
| 2015/0380173 | A1* | 12/2015 | Li | C25D 9/04 |
| | | | | 428/698 |
| 2016/0104881 | A1* | 4/2016 | Bae | H01M 4/62 |
| | | | | 429/231.8 |
| 2016/0111755 | A1* | 4/2016 | Liu | H01M 4/505 |
| | | | | 429/152 |
| 2017/0194640 | A1* | 7/2017 | Bucur | H01M 4/622 |
| 2017/0301960 | A1* | 10/2017 | Menard | H01M 10/24 |
| 2018/0238372 | A1* | 8/2018 | Villet | F16B 19/10 |
| 2020/0020945 | A1* | 1/2020 | Zhi | H01M 4/663 |
| 2020/0358141 | A1* | 11/2020 | Jang | H01M 10/4235 |

OTHER PUBLICATIONS

Singh et al, Implementation of Bismuth Chalcogenides as an Efficient Anode: A Journey from Conventional Liquid Electrolyte to an All-Solid-State Li-Ion Battery, Molecules, 25, pp. 3733, (2020). (Year: 2020).*

Bai et al, Synthesis of Bi2S3/carbon nanocomposites as anode materials for lithium-ion batteries, Journal of Materials Science and Technology, 50, 92-102 (2020). (Year: 2020).*

Zhu et al, Antifreezing Hydrogel with High Zinc Reversibility for Flexible and Durable Aqueous Batteries by Cooperative Hydrated Cations, Advanced Functional Materials, 30, 1907218, 2020. (Year: 2020).*

Yao, B., et al, "Ultrahigh-Conductivity Polymer Hydrogels with Arbitrary Structures" Advanced Materials 2017, 29 (28).

Ni, J., et al, "Strongly Coupled Bi2S3@CNT Hybrids for Robust Lithium Storage" Advanced Energy Materials 2014, 4 (16).

Sun, J.-Y. et al. "Highly stretchable and tough hydrogels" Nature 2012, 489, 133-136.

Vosgueritchian, M., et al, "Highly Conductive and Transparent PEDOT:PSS Films with a Fluorosurfactant for Stretchable and Flexible Transparent Electrodes" Advanced Functional Materials 2012, 22 (2), 421-428.

* cited by examiner

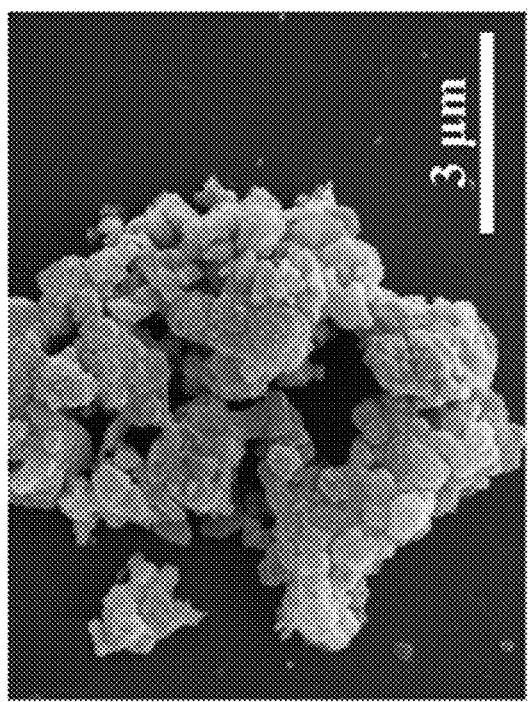
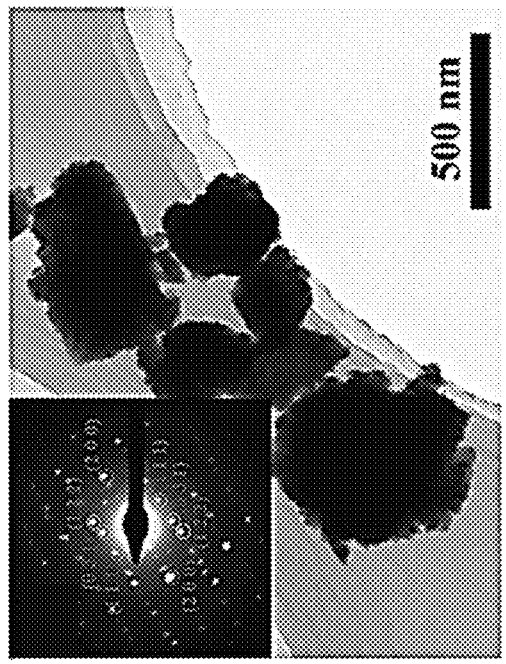
Fig. 5A
Fig. 5B

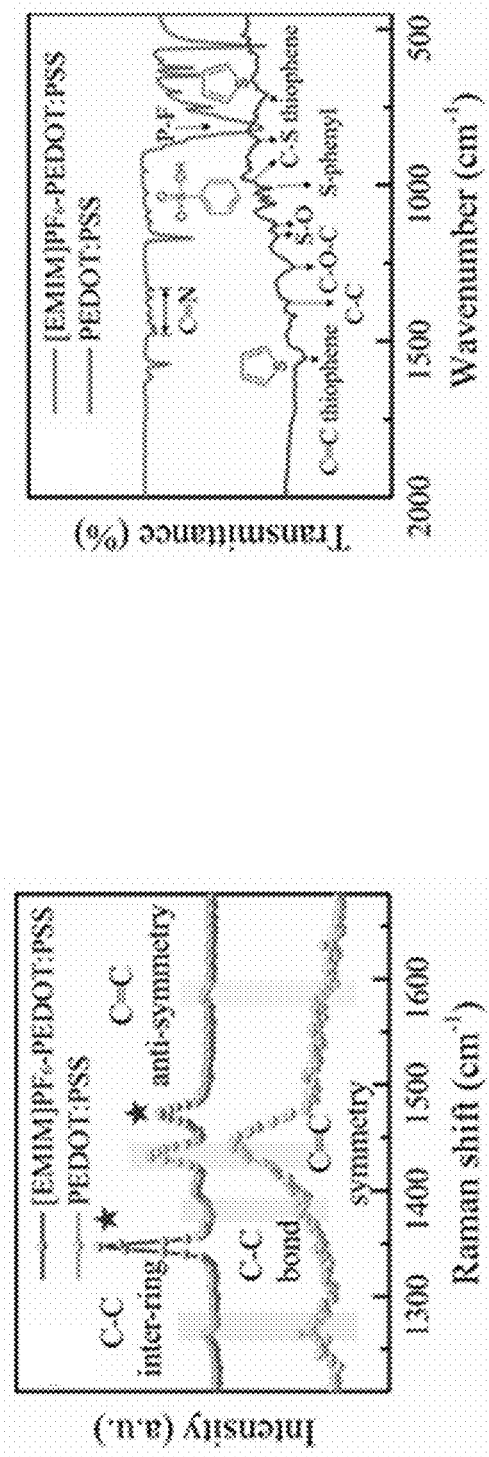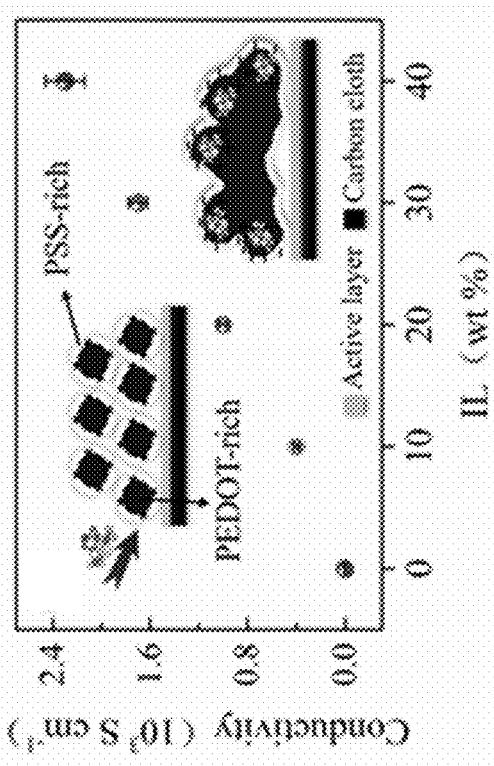
Fig. 9D
Fig. 9E
Fig. 9F

ENERGY STORAGE DEVICE AND AN ELECTRODE FOR AN ENERGY STORAGE DEVICE

TECHNICAL FIELD

The present invention relates to an electrode and an energy storage device containing said electrode, in particular, but not exclusively, to an electrode for a flexible battery.

BACKGROUND

Flexible and wearable devices are growing in use and are starting to become more mainstream. Flexible and wearable devices are being incorporated into wearable products that are also starting to become more popular and are starting to gain a wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an electrode for an energy storage device, comprising: an active material including a material structure of metal sulfides; a conductive polymer including an ionic liquid disposed on the active material; wherein the combination of the conductive polymer and the ionic liquid is arranged to maintain integrity of the material structure and facilitate ion transportation across the material structure during an operation of charging and discharging cycle of the energy storage device.

In an embodiment of the first aspect, the conductive polymer includes a layer of PEDOT:PSS arranged to stabilize the material structure during the operation of charging and discharging cycle of the energy storage device.

In an embodiment of the first aspect, the layer of PEDOT:PSS is arranged to dissipate mechanical stress from a volume change of the material structure upon performing an insertion and/or extraction of the ions in the electrode, thereby preventing the material structure from collapsing.

In an embodiment of the first aspect, the layer of PEDOT:PSS is arranged to operate as a solid electrolyte interphase (SEI) between the material structure and an electrolyte of the energy storage device, thereby preventing the material structure from dissolving into the electrolyte.

In an embodiment of the first aspect, the layer of PEDOT:PSS includes a plurality of PEDOT chains and PSS chains interacting with the ionic liquid so as to provide a porous structure for increasing the ion transportation during the operation of charging and discharging cycle of the energy storage device.

In an embodiment of the first aspect, the plurality of PEDOT chains is arranged to partially isolate from the plurality of PSS chains thereby providing more channels for the ion transportation.

In an embodiment of the first aspect, the ionic liquid is arranged to weaken the interactions between the PEDOT chains and the PSS chains thereby changing conformation of the chains to the channels.

In an embodiment of the first aspect, the ionic liquid includes 1-ethyl-3-methylimidazolium-hexafluorophosphate ([EMIM]$PF_6$).

In an embodiment of the first aspect, the active material includes bismuth sulfide ($Bi_2S_3$).

In an embodiment of the first aspect, the active material is disposed on a substrate.

In an embodiment of the first aspect, the substrate includes carbon cloth.

In accordance with the second aspect of the present invention, there is provided an energy storage device, comprising: a first electrode; a second electrode in accordance with the first aspect of the present invention; and an electrolyte including an aqueous electrolytic solution disposed between the first and the second electrodes.

In an embodiment of the second aspect, the electrolyte includes a hydrogel containing a high concentration salt solution.

In an embodiment of the second aspect, the electrolyte includes the hydrogel of polyacrylamide containing at least one salt with a concentration of 1-21 mol $kg^{-1}$.

In an embodiment of the second aspect, the first electrode is an anode including zinc.

In an embodiment of the second aspect, the zinc metal is electrodeposited on a substrate.

In an embodiment of the second aspect, the substrate includes carbon cloth.

In an embodiment of the second aspect, the hydrogel is flexible such that the device is arranged to be operable upon subjecting to a bending condition.

In an embodiment of the second aspect, the high concentration of salt is arranged to reduce freezing point of the electrolyte such that the device is arranged to maintain its capacity reversibility under a low temperature condition.

In an embodiment of the second aspect, the device is a rechargeable battery.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 5A is a SEM image showing the morphology of $Bi_2S_3$.

FIG. 5B is a TEM image showing the morphology of $Bi_2S_3$. The insert shows the corresponding SAED analysis of the $Bi_2S_3$.

FIG. 9D refers to Raman spectra of PEDOT:PSS and [EMIM]$PF_6$-PEDOT:PSS films.

FIG. 9E refers to FTIR spectra of the PEDOT:PSS and the [EMIM]$PF_6$-PEDOT:PSS films.

FIG. 9F is a plot of conductivity against weight percentage of ionic liquid showing the conductivity of the [EMIM]$PF_6$-PEDOT:PSS film under different ionic liquid concentrations. The insert illustrates the role of [EMIM]$PF_6$ in improving the conductivity of the film.

DETAILED DESCRIPTION OF THE PREFERRED EMBODIMENTS

Figure 1:
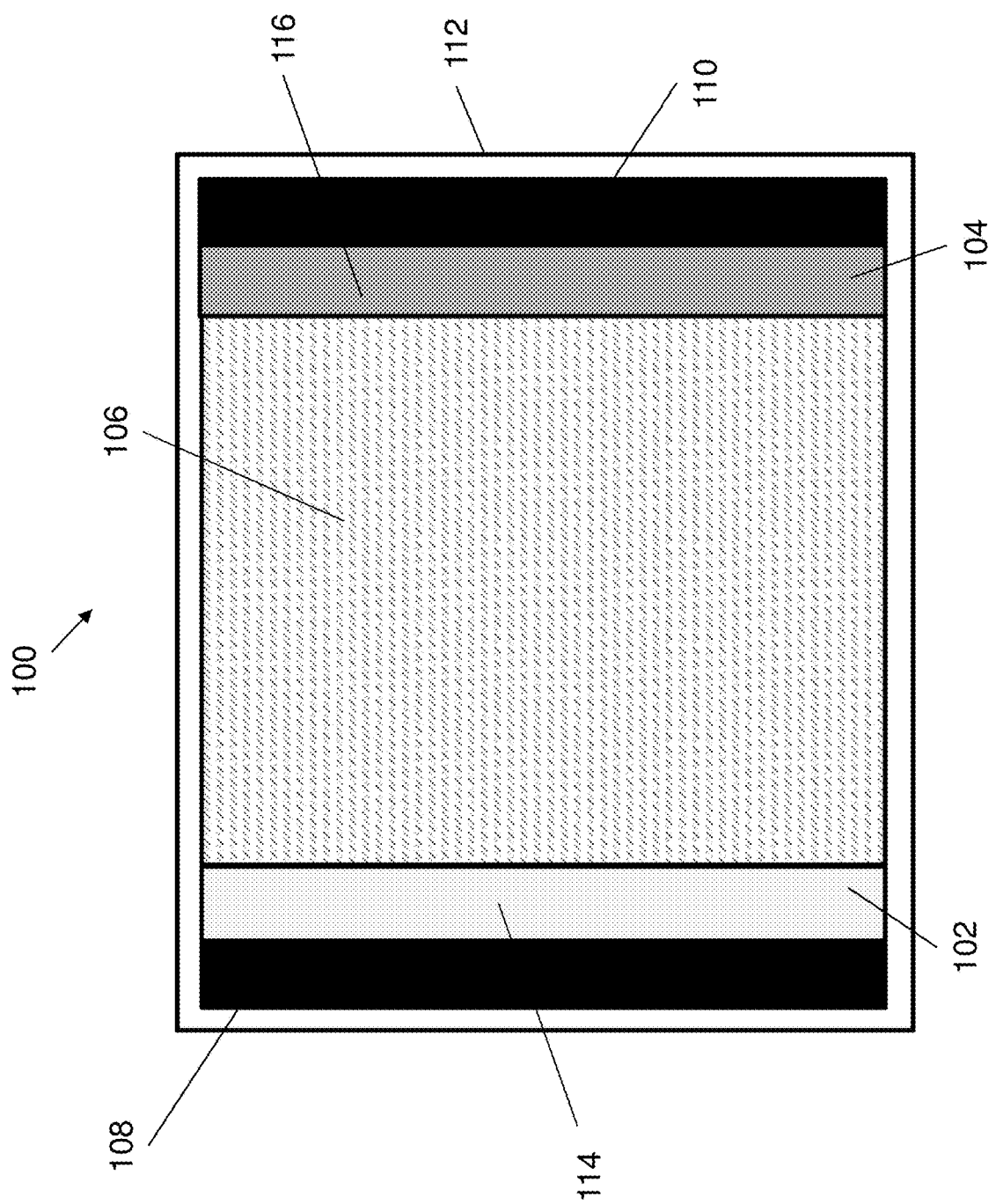
FIG. 1 illustrates of an energy storage device in accordance with an embodiment of the present invention.

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-ion battery (ZIB) which may include advantages such as having much less toxic and flammable materials therein as compared with lithium-ion batteries, therefore may have much less safety and/or health concern to users. ZIB may also be low cost for scaling up as a result of the water-free and/or oxygen-free environment for assembling the battery. In addition, ZIB may have a high specific capacity as a result of multiple electron transfer and a low redox potential of $Zn^{2+}$/Zn.

Nowadays, apart from pursing electronic devices with multifunction, users also demand for an electronic device with extraordinary operation lifetime. In particular, one of the crucial factors governing the operation lifetime of the device may be the electrodes of the battery. It is appreciated that during the operation of the battery (including charging and discharging processes), there is a repeated insertion and extraction of ions in the cathode/cathode material. Such repeated insertion and extraction may render a repeated dramatic volume change in the cathode/cathode material. In any cases the cathode/cathode material is not stable/strong enough to endure said volume change, the cathode/cathode material may degrade/collapse gradually and therefore leading to a capacity decay of the battery.

In addition, it is appreciated that human bodies and organs are soft, curved, and constantly moving, flexible and wearable devices will therefore experience various mechanical forces during routine use, including forces from, for example, stretching, folding, hitting, shearing, and the like. Furthermore, it is also desirable that the device may be operable under harsh environments such as under a condition with a temperature of ice. Accordingly, it may be preferable to provide an energy storage device with a high capacity, stable cycling performance as well as being operable with stable electrochemical performance under different deformations and harsh environment conditions.

In accordance with an example embodiment of the present invention, there is provided an energy storage device with a high reversible capacity and cycling stability. The device may have a reversible capacity of 274 mAh g$^{-1}$ at 0.3 A g$^{-1}$ and cycling stability of 95.3% capacity retention after 5000 charge/discharge cycles. The device may include a pair of electrodes and an electrolyte containing an aqueous electrolytic solution. In particular, one of the electrodes may comprise a conductive polymer including an ionic liquid. Preferably, the combination of the conductive polymer and the ionic liquid may facilitate the electrochemical performance of the energy storage device.

With reference to FIG. 1, there is shown an exemplary embodiment of an energy storage device 100. The energy storage device 100 may be of any form that can capture energy produced at one time for use at a later time. In this example, the energy storage device is a battery, in particular a rechargeable battery. The battery 100 may be of any suitable form that fits a particular application, such as flat-shaped, fiber-shaped, twisted fiber-shaped, coin-shaped, ball-shaped, and the like. Regardless of the shape of the battery, the battery may substantially have an increased capacity and long lasting cycling performance. The battery may also be substantially resistant to external mechanical force and harsh environmental conditions while the electrochemical performance of the battery is maintained.

In this embodiment, the battery 100 comprises a first electrode 102 and a second electrode 104 being spaced apart from each other and an electrolyte 106 disposed between the electrodes 102, 104. The electrolyte 106 is sandwiched between and is electrically coupled with the electrodes 102, 104. The electrodes 102, 104 may function as an anode and a cathode, respectively or vice versa.

Optionally or additionally, the battery 100 may also include substrates 108, 110 which may provide mechanical supports to the electrode 102 and/or the electrode 104. The substrates may also operate as a current collector to associate with the first electrode 102 and the second electrode 104 respectively. For example, the substrates may be electrically conductive and may be bonded to external electrical wires to deliver electrical energy to external electronic devices.

The battery 100 may optionally include an encapsulation 112 that receives and encases the first electrode 102, second electrode 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the first electrode 102 functions as an anode and the second electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement dependent on the desired shape of the battery 100.

With reference to FIG. 1, the first electrode 102 (i.e. anode) comprises a substrate 108 with a metal or metal compound 114 disposed on the substrate 108. The substrate 108 may be of any suitable material. In one example the substrate 108 is a carbon cloth. Alternatively the substrate 108 may be selected from carbon nanotube (CNT) paper, carbon paper, nickel/copper alloy cloth or steel sheet. The substrate 108 may have some electrical conductance but is preferably robust enough to function within an electrolyte.

The anode 102 preferably comprises zinc. In one example, the anode may be a zinc sheet, particularly zinc nanosheet 114 that is electrodeposited onto carbon cloth 108. The carbon cloth 108 provides a base layer for the zinc to be deposited onto. The carbon cloth 108 may also have a rough surface with interwined structures which in turn facilitates the deposition of materials thereon. The zinc is deposited to form a substantially thick layer of zinc 114. The thickness may depend on the operational life of the battery 100.

In one example, the electrodeposited zinc may be highly crystalline and uniformly cover the entire surface of the carbon cloth. In particular, the electrodeposited zinc may have a highly porous architecture comprising interconnected nanoflakes. This may be advantageous as the nanocrystalline and porous structure may reduce ion diffusion path which in turn facilitating electrolyte penetration as well as charge/ion transport.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100, or the anode may comprises zinc being deposited or electroplated on other types of substrates such as metal sheet include nickel and/or copper.

The second electrode 104 (i.e. cathode) comprises a substrate 110 with an active material 116 disposed on the substrate. In one example, the substrate 110 may be in similar construction to the anode substrate 108. That is, the substrate 110 comprises a carbon cloth. Alternatively the substrate may be a CNT paper, carbon paper, nickel/copper alloy cloth or steel sheet.

The active material 116 comprises metal sulfides or a metal sulfide compound. In one example, the metal sulfides or the metal sulfide compound may advantageously have a bandgap of 1.3 eV and may be environmentally-friendly. The metal sulfides or the metal sulfide compound may form a plurality of layers defining a material structure. Preferably, the active material 116 may include bismuth sulphide ($Bi_2S_3$). The bismuth sulphide may form a plurality of layers overlaying with each other so as define a material structure with interlayer spacings for ion diffusion during the operation of the battery.

The second electrode 104 may also include a conductive polymer 118 (not shown) disposed on the active material 116. The conductive polymer may be operable to stabilize the active material/material structure 116 during the operation of charging and discharging cycle of the energy storage device. In one example, the conductive polymer may include a layer of PEDOT:PSS which prevents the material structure from collapsing and/or dissolution upon performing an insertion and/or extraction of the ions in the electrode. As such, the integrity of the electrode may be maintained and therefore the capacity as well as the cycling performance of the battery may be maintained even after a prolonged usage.

The conductive polymer 118 may further include an ionic liquid 120 (not shown). The combination of the ionic liquid and the conductive polymer may have a synergistic effect by which the electrochemical performance of the electrode during long-term operation may be maintained or increased. For example, the ionic liquid may interact with the conductive polymer to change the conformation of the polymer thereby facilitating ion transportation across the electrode and therefore increasing the conductivity of thereof. Detailed structural arrangement of the active material and the conductive polymer as well as the mechanism of synergistic effect of these components will be discussed in the later part of this disclosure.

The electrolyte 106 may be an aqueous electrolytic solution being disposed/contained in the encapsulation 112 and the anode 102 and the cathode 104 are positioned within the electrolyte. In particular, the aqueous electrolytic solution may include a high concentration salt solution containing at least one ion of $Li^+$, $Na^+$, $Ca^{2+}$, $Mg^{2+}$, $Zn^{2+}$, $Al^{3+}$, or $Fe^{2+}$. In one example, the aqueous electrolyte solution may contain $Li^+$ and $Zn^{2+}$ with a concentration of 1-21 mol $kg^{-1}$.

Advantageously, the high concentration salt solution may enable high coulombic efficiency (CE) which further increases the conductivity of the battery. The high concentration of salt may also lower the freezing point of the electrolytic solution such that the electrolytic solution is more difficult to turn into a solid form (e.g. ice), rendering the battery operable under a low temperature condition. Furthermore, the high concentration of salt may facilitate the maintenance of integrity of the active material 116. For example, the salt (i.e. ion) may retain water within the electrolytic solution by forming coordination compound with the water molecules. As such, the water molecules may be less or not available for interacting, particularly solvating the active material, which in turn preventing the active material from dissolving into the electrolyte. A skilled person may recognize any other electrolytic solutions including suitable salts or ions according to their needs.

Alternatively, the electrolyte 106 may be a polymeric electrolyte such as a gelatin-based electrolyte disposed between the anode 102 and the cathode 104. Preferably, the gelatin-based electrolyte 106 may be a hydrogel electrolyte such as a hydrogel of polyacrylamide (PAM) containing an aqueous electrolytic solution particularly a high concentration salt solution containing at least one ion of $Li^+$, $Na^+$, $Ca^{2+}$, $Mg^{2+}$, $Zn^{2+}$, $Al^{3+}$, or $Fe^{2+}$. The concentration of ions in the salt solution may be of 1-21 mol $kg^{-1}$. The hydrogel electrolyte is viscous enough to be formed into a shape and retain the shape it is formed into.

For example, the electrolyte 106 may be formed into any one of an elongated shape, a planar shape, a tubular shape, a ball shape or any suitable shape. The electrolyte 106 is also capable of being retained within the battery 100 by being sandwiched between the electrodes 102 and 104. In other words, the electrodes 102 and 104 are disposed on opposite sides of the electrolyte 106.

The electrolyte 106 may be flexible and may dissipate at least some mechanical energy when subjected to an external mechanical load applied to the battery 100, thereby allowing the battery 100 to maintain its electrochemical performance while under deformation. For example, the battery 100 may physically deform into different irregular shapes under the conditions of bending, folding, squeezing, twisting, cutting, and hammering while dissipating energy therefrom, and maintaining the electrochemical performance. In other words, the electrolyte may be capable of withstanding a certain amount of mechanical forces applied thereonto while the integrity of the electrolyte and thereby the battery is maintained.

The aforementioned advantages of the electrodes and/or the battery will be further illustrated in the examples discussed in the later part of this disclosure.

Figure 2A:
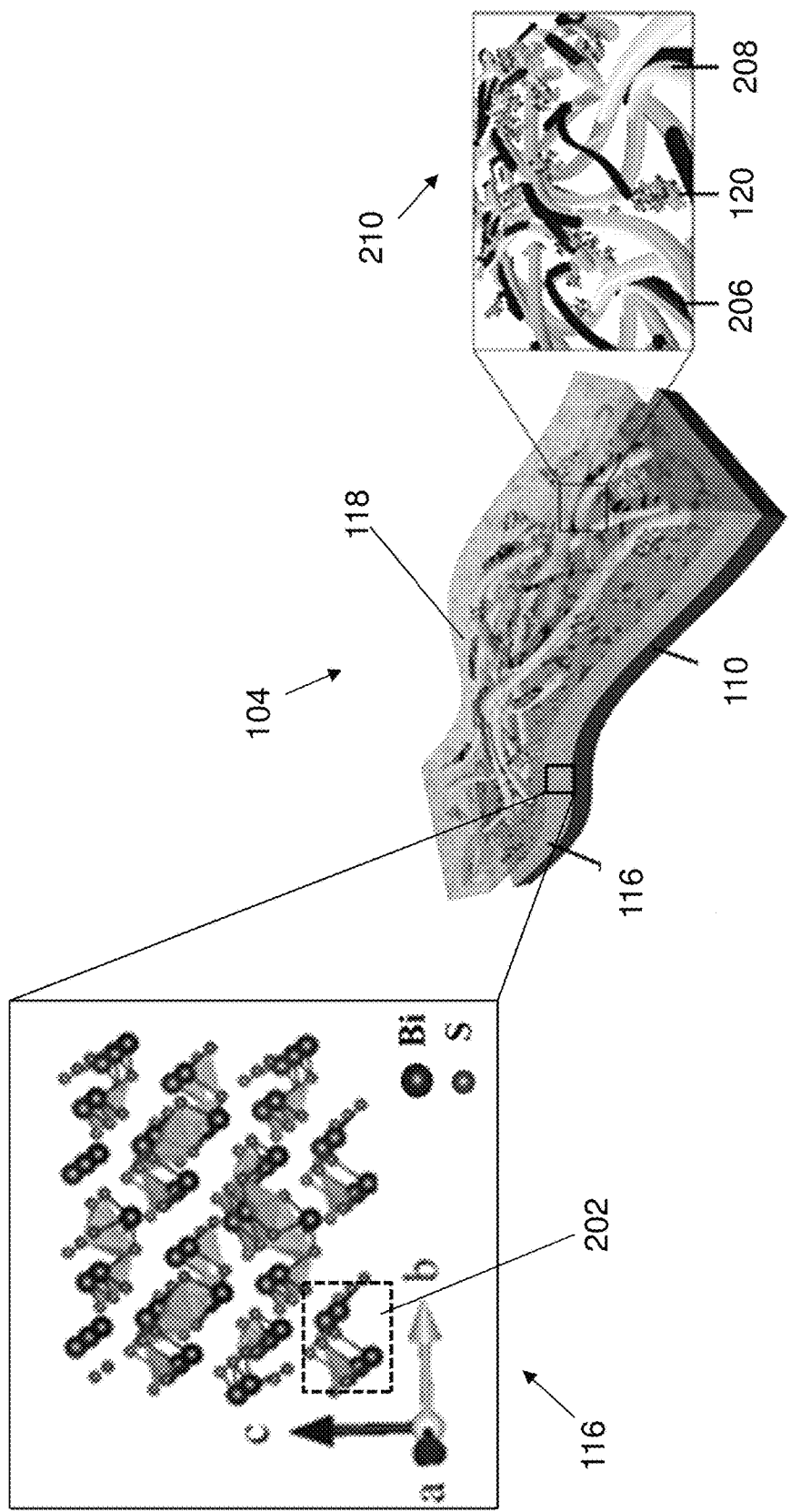
FIG. 2A illustrates the structure of an electrode of the energy storage device of FIG. 1.

With reference to FIG. 2A, the electrode 104 (i.e. the cathode 104) comprises an active material 116 disposed on a substrate 110. The active material 116 may include a layer material structure. The active material may be structured or arranged into a plurality of layers, therefore ions/active components in the battery interact with the active material in each of these individual layers in the layer material structure during a charging or discharging operation of the battery.

The cathode 104 also comprises a conductive polymer 118 disposed on the active material 116. The conductive polymer 118 may include an ionic liquid 120 such that the combination of these components may be operable to maintain integrity of the material structure and facilitate ion transportation across the material structure during an operation of charging and discharging cycle of the battery.

In one embodiment, the layered material structure includes a plurality of layers of active material overlaying with each other. The active material layers may include metal sulfides forming a plurality of coordination compounds 202 loosely connecting with each other. In this example, each of the metal sulfide coordination compounds 202 include four metal centres bonded with six sulfide ligands (i.e. thio ligands), forming a ribbon complex (a ribbon unit). Each of the ribbon units is bonded with each other without a particular orientation by the interactions such as van der Waals forces between each unit, which in turn forming a plurality of highly anisotropic layers defining the layered material structure of the active material. Such loosely arranged structure may therefore provide sufficient interlayer spacing for ions diffusing into/across the material structure during the charging and discharging processes.

Figure 2B:
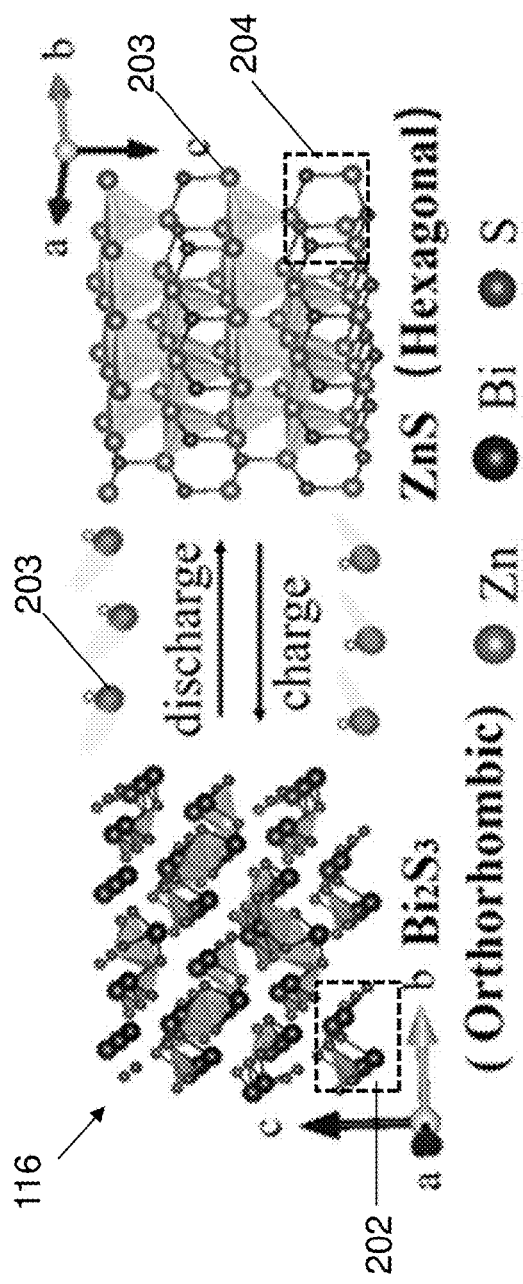
FIG. 2B illustrates a conversion reaction of an active material of the electrode of FIG. 2B during a charge/discharge process.

Nevertheless, such loosely arrangement may also render the material structure less susceptible to volume change upon performing repeated ion insertion and extraction during the charging and discharging processes. For example, as shown in FIG. 2B, during the discharging process, ions/active components 203 from the anode and/or electrolyte may insert into the interlayer spacing of the material, which in turn expanding the material structure. The inserted ions/active components may interact with the ribbon units 202 and may substitute the metal centres of the ribbon units to form new complexes/units 204. In contrast, during the charging process, the ions/active components 203 may be extracted from the layered material structure, which in turn leading to a volume contraction within the structure and the reformation of the ribbon units. The material structure may be divided into a plurality of fewer-layered structures during the reformation of the ribbon units. In other words, the material structure may be partially recovered during every charging/discharging cycle. As a result, the material structure will be collapsed eventually and therefore the capacity of the battery decays accordingly.

The conductive polymer disposed on the active material may prevent the material structure from collapsing during the aforementioned processes. As shown in FIG. 2A, the conductive polymer may include a layer of polymer matrix comprising a plurality of polymer chains of a first polymeric material 206 and a plurality of polymer chains of a second polymeric material 208. The polymer chains 206 may interact with the polymer chains 208 such as by Coulombic interactions between the functional groups of the polymer chains 206, 208 to form a crosslinked structure 210.

During the charging/discharging cycles, the conductive polymer may function as a buffer layer to dissipate/accommodate mechanical stress from the volume change of the material structure 116 upon performing the aforementioned ion insertion and extraction. Preferably, as a result of the close proximity of the crosslinked structure 210 and the material structure 116, the crosslinked structure may at least partially expanded and contract together with the material structure during the ion insertion and extraction. Accordingly, the mechanical stress aroused from the volume change of the material structure during said insertion and extraction may be shared by or dissipated among the polymer chains 206, 208 of the crosslinked structure 210.

The conductive polymer may further function as a stabilizing layer to prevent the material structure from dissolution. Preferably, the conductive polymer may operate as a solid electrolyte interphase (SEI), more preferably an artificial SEI to at least partially reduce the amount of solvent molecules such as water molecules from interacting with and therefore dissolving the material structure, particular the sulfide of the ribbon units. Thus, the integrity of the material structure may be maintained.

Figure 2C:
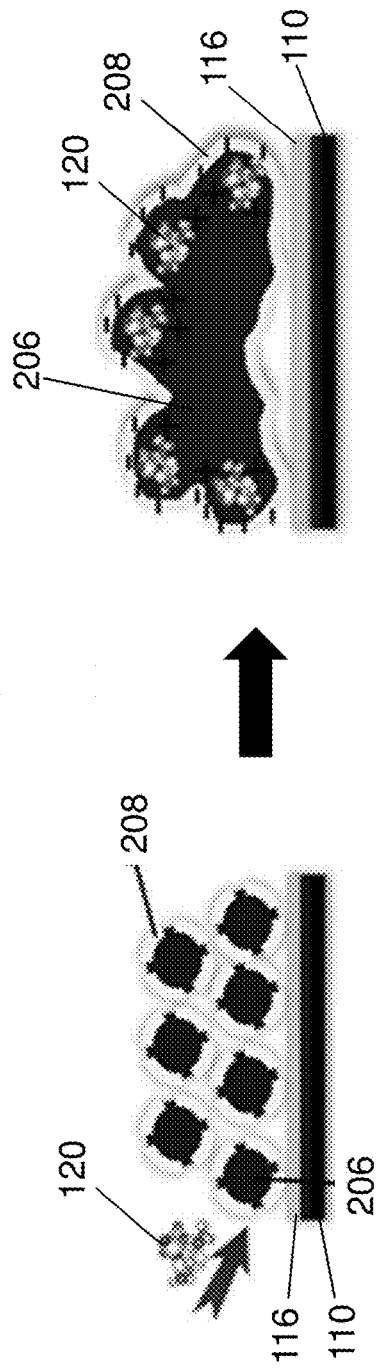
FIG. 2C illustrates the mechanism of an ionic liquid improving the conductivity of the electrode of FIG. 2A.

In addition, the conductive polymer may also facilitate ion transportation across the material structure thereby increasing the conductivity of the battery. The ion liquid 120 may be small enough to penetrate through the crosslinked structure 210 and interacts with both polymer chains 206 and 208. As shown in FIG. 2C, the ionic liquid 120 may interact with both positively charged chains 206 and negatively charged chains 208, which may result in a charge screening effect weakening the interactions particularly the Coulombic interactions between chains 206, 208. In turn, the polymer chains 206 may partially isolated from the chains 208, providing a porous structure (i.e. a structure with more channels) for ion diffusion. Thus, the conductivity of the electrode as well as the battery may be increased.

Referring to FIG. 2A, there is shown an example illustrating a cathode 104 comprising an active material 116 disposed with a conductive polymer 118 thereon. As mentioned, the active material includes a material structure of metal sulfides whereas the conductive polymer includes an ionic liquid 120. In this example, the active material includes a material structure of bismuth sulfide ($Bi_2S_3$) which disposed thereon with a conductive polymer of PEDOT:PSS including an ionic liquid of 1-ethyl-3-methyl-imidazolium-hexafluorophosphate ($[EMIM]PF_6$).

The bismuth sulfides are arranged into a plurality of two dimensional layers. Each layer is defined by a plurality of $Bi_4S_6$ ribbon-like units. In particular, the $Bi_4S_6$ ribbon-like units are arranged in parallel to the c-axis. The $Bi_4S_6$ ribbon-like units interact with each other by weak van der Waals' force, forming a plurality of layers perpendicular to the a-axis. As mentioned, the layered material may experience repeated volume expansion and contraction during the charging and discharging processes.

For example, considering a zinc-ion battery, zinc ions from the anode and/or the electrolyte are inserted into the bismuth sulfide layered structure during the discharging process (FIG. 2B). The zinc ions interact with the structure and substitute the Bi centres of the structure, thereby forming a material structure of zinc sulfide having an orientation different from the material structure of bismuth sulfide. When the battery is under the charging process, the zinc ions will be extracted from the ZnS structure, leading to a volume contraction with the ribbon $Bi_4S_6$ units reformed at the same time. As mentioned, the reformed $Bi_4S_6$ units may be arranged into a plurality of fewer-layered structures. As a result, as the charging/discharging cycles proceed, the number of the fewer-layered structures will increase and eventually become fragments that are not capable of reforming the layered structure. In other words, the layered material structure collapses eventually.

As mentioned, the combination of the conductive polymer and the ionic liquid may maintain the integrity of the material structure as well as facilitating ion transportation across the material structure. Referring to FIG. 2A, the conductive polymer includes a polymer matrix comprising a plurality of PEDOT chains and a plurality of PSS chains. The sulfonate groups of the PSS chains form Coulombic interactions with the sulphur groups of the PEDOT chains thereby forming a crosslinked PEDOT:PSS structure. Preferably, the PEDOT chains may adhere to segments of the PSS. As a result of the close proximity of the PEDOT:PSS structure and the $Bi_2S_3$ material structure, the mechanical stress induced within the $Bi_2S_3$ material structure due to the aforementioned volume change may be shared/dissipated by the PEDOT and PSS chains. The conductive polymer also operates as an artificial SEI which reduces the amount of water molecules from interacting with the sulphide group of the $Bi_2S_3$ material structure, thus preventing the sulphide group from dissolution. Accordingly, the integrity of the material structure is maintained.

The ionic liquid $[EMIM]PF_6$ within the PEDOT:PSS structure interacts with the PEDOT chains and the PSS chains so as to change the conformation of the PEDOT and the PSS chains. (FIG. 2C) Owing to the small size of the $[EMIM]PF_6$, it can penetrate the PEDOT:PSS structure and interacts with both the positively charged PEDOT and the negatively charged PSS chains, thereby resulting in a charge screening effect weakening the Coulombic interactions between the PEDOT and PSS chains. As a result, the PEDOT chains partially isolate from the PSS chains, forming a porous structure with more channels for zinc ions transportation, thereby increasing the conductivity of the electrode as well as the battery.

It is appreciated that the electrode particularly the cathode would inevitably experience the aforementioned repeated and sudden change of structure upon the charging and/or discharging processes. Thus, an electrode of the present disclosure may be particularly advantageous as it is capable of providing ion diffusion facilitation as well as maintaining the stability and durability thereof.

The energy storage device of the present disclosure such as the battery 100 may be fabricated by commencing at the step of fabricating the electrodes. It may be first forming or providing a first electrode. In one example, the first electrode may be an anode formed by a zinc sheet. In another example, the first electrode may be an anode formed by electrodepositing zinc metal onto a substrate. Preferably, the substrate is a carbon cloth. Alternatively the substrate may be selected from carbon nanotube (CNT) paper, carbon paper, nickel/copper alloy cloth or steel sheet. The electrodeposition time may depend on the thickness requirement, which may depend on the operational life of the battery.

In this example, the anode is prepared by a facile electrochemical deposition method on the carbon cloth substrate. A two-electrode setup was used for Zn electroplating, in which the carbon cloth may be used as a working electrode, while zinc plate was used as both counter and reference electrodes. An aqueous solution containing 1 M of $ZnSO_4$ as used as the electrolyte. The electroplating was performed at 8 mA cm$^{-2}$ for 50 min using an electrochemical workstation (CHI 760D). The effective mass loading of zinc is about 4 mg cm$^{-2}$.

A second electrode may be fabricated after obtaining the first electrode (i.e. anode). In one example, the second electrode is a cathode. The fabrication of the cathode may comprise the steps of a) preparing an active material including a material structure of metal sulfides; b) preparing a conductive polymer including an ionic liquid; and c) disposing the active material and the conductive polymer on a substrate; wherein the combination of the conductive polymer and the ionic liquid is arranged to maintain integrity of the material structure and facilitate ion transportation across the material structure during an operation of charging and discharging cycle of the energy storage device.

In one example, the active material may include bismuth sulfides. The bismuth sulfides may be prepared by a ball-milling process. In particular, the precursors of the bismuth sulfides may be loaded into a ball-milling jar with a predetermined ratio. The jar containing the precursors may then be subjected to a high energy mechanical milling (HEMM) process for a period of time with a predetermined rotation speed. In this way, bismuth sulfides particularly bismuth sulfide powders of predetermined grain size such as 20-50 nm may be obtained.

In this example, the precursors Bi (99.999%, Alfa Aesar) and S (99.999%, Alfa Aesar) are loaded into a stainless steel ball-milling jar according to the stoichiometric ratio of $Bi_2S_3$ in a glove-box under argon atmosphere. The jar is then subjected to a high energy mechanical milling (HEMM) process for 20 h at 1200 rpm to obtain the $Bi_2S_3$ powders with grain sizes ranging 20-50 nm.

The step b) of preparing a conductive polymer including an ionic liquid preferably including the steps of obtaining a precursor solution of the conductive polymer with a predetermined particle size; forming a mixture of the precursor solution and the ionic liquid; curing the mixture at an ambient or elevated temperature to form a polymeric film; and subject the polymeric film to an annealing process.

In one example, the conductive polymer may be PEDOT:PSS whereas the ionic liquid may be [EMIM]($PF_6$). The precursor solution of PEDOT:PSS may be filtered by technical means such as membrane filter of particular pore size. The precursor solution with a predetermined particle size may then be mixed with the ionic liquid to obtain a mixture of [EMIM]($PF_6$) and PEDOT:PSS film. The mixture may then be transferred to a mold and cure at an ambient or elevated temperature to obtain a polymeric film. The polymer film may further subject to an annealing process to obtain a conductive polymer of [EMIM]($PF_6$)-PEDOT:PSS.

In this example, a solution of poly(3,4-ethylenedioxythiophene):poly(4-styrenesulfonate) (PEDOT:PSS, Clevios PH1000) was filtered through a hydrophilic syringe (pore size of 0.45 μm) to remove any large-size particles. The filtrate was mixed with 10 wt. % of 1-ethyl-3-methylimidazolium-hexafluorophosphate ionic liquid ([EMIM]$PF_6$, Sigma-Aldrich Chemical Co.) and stirred vigorously for at least 30 min to ensure thorough mixing. The mixture was transferred to a Teflon mold and dried overnight to obtain a thick film, which was then annealed at 130° C. for 15 min. At this stage, a film of [EMIM]$PF_6$-PEDOT:PSS is obtained.

The step c) of disposing the active material and the conductive polymer on a substrate including the step of forming a slurry of the active material. In particular, the active material powders obtained in the step a) may be mixed with a conductive material and a binder under a predetermined weight ratio in a solvent to form a slurry.

In this example, the active material of bismuth sulfide (70 wt. %) was dissolved in N-methyl-2-pyrrolidone (NMP) (i.e. solvent) and mixed with 20 wt. % of acetylene black (i.e. conductive material) and 10 wt. % of PVDF (i.e. binder) to obtain a slurry.

The slurry may then be uniformly transferred to a substrate such as a carbon cloth, followed by disposing the film of [EMIM]$PF_6$-PEDOT:PSS to obtain the cathode of the present invention. The [EMIM]$PF_6$-PEDOT:PSS/$Bi_2S_3$ cathode may be additionally or optionally dried for at least 8 hours under ambient condition followed by 70° C. in air for 15 min to remove residual water.

The electrolyte, particularly the gelatin-based electrolyte, preferably the hydrogel electrolyte of the energy storage device may be prepared by forming a mixture of a gel monomer, an initiator and a crosslinking agent in an aqueous electrolytic solution. The aqueous electrolytic solution may be a salt solution containing at least one ion with a concentration of 1-21 mol $kg^{-1}$.

The gel mixture is optionally subjected to a degas process to remove any air bubbles therein, facilitating the subsequent curing process. The mixture may be cured at room temperature or at an elevated temperature in a mold.

In one example, the hydrogel electrolyte may be polyacrylamide (PAM). The method of forming the hydrogel electrolyte may start with preparing the aqueous electrolytic solution. In particular, the aqueous electrolytic solution may be prepared by adding 21 mol $kg^{-1}$ of LiTFSI and 1 mol $kg^{-1}$ of Zn(TFSI)$_2$ to 15 mL of DI water under strong agitation.

After that, the as-prepared salt solution is added with 0.05 g of ammonium persulphate (i.e. initiator), 5 mg of N,N'-methylenebisacrylamide (MBAA) (i.e. crosslinking agent), and 4 g of acrylamide monomer (i.e. gel monomer) to form a gel mixture. The mixture was stirred for 2 h at room temperature until a transparent dispersion is obtained. The mixture was then transferred into a mold such as a glass mold and heated at 65° C. for 2 h to allow in-situ free-radical polymerization. The as-prepared hydrogel may be peeled off and optionally dried under room temperature or an elevated temperature.

The aforementioned in-situ polymerization process may be advantageous in that the electrolyte ions are directly entrapped within the polymer matrix during the polymerization process rather than passively diffuse into the polymer matrix after the polymerization process. In other words, the step of subjecting an as-prepared hydrogel electrolyte to an ion exchange process with an external solution is no longer required, rendering the electrolyte preparation simpler and more convenient. Such in-situ process may also ensure the polymer matrix entrapping most of the electrolyte ions.

The battery 100 may be assembled in an open air environment. In one example, the battery may be a flexible battery. The battery may be assembled by sandwiching a hydrogel electrolyte (e.g. PAM) with the aforementioned anode and cathode.

The characterization and performance of embodiments of the electrode and the energy storage device containing the electrode will now be discussed. X-ray diffraction measurements were performed on a Bruker D2 Phaser diffractometer with Cu-Kα radiation (λ=1.54 Å). The XRD refinement was carried out by the RIETAN-2000 Rietveld refinement software. Inductively coupled plasma atomic emission spectroscopy (ICP-AES) analysis was operated using PerkinElmer Optima 8300. Raman spectroscopy was measured with a multichannel modular triple Raman system (Renishaw inVia). The microstructure and morphology of the electrode materials were studied by utilizing field-emission SEM (FEI/Philips XL30) equipped with the accessory energy dispersive X-ray spectroscopy attachment to determine composite elements, and TEM (JEOL-2001F). The chemical state and composition were analyzed by XPS (Escalab 250, Thermo).

Cyclic voltammetry (CV) and electrochemical impedance spectroscopy (100 kHz to 0.01 Hz) were tested by employing an electrochemical workstation (CHI 760D, Chenhua). Galvanostatic discharge/charge was measured between 0.1 and 2.3 V utilizing a land 2001A battery testing system with CR2032-type coin cells for aqueous battery and planar thin film battery for quasi-solid battery, respectively.

Figure 3A:
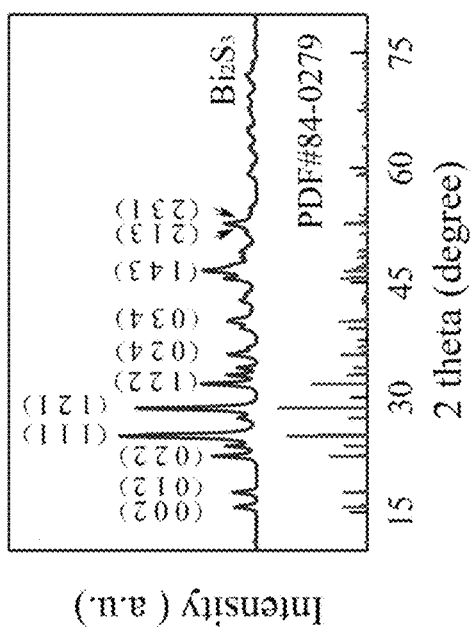
FIG. 3A is a plot showing XRD patterns of as-prepared $Bi_2S_3$.

$Bi_2S_3$ of the present disclosure was prepared by a facile and batch method of high-energy mechanical milling (HEMM). The as-prepared $Bi_2S_3$ was used as the active material of the cathode. The crystal structure of $Bi_2S_3$ was investigated by XRD. All peaks in the XRD patterns were readily indexed to the orthorhombic $Bi_2S_3$ (PDF #84-0279) with the space group of Pmcn (no. 62). It was found that the intensity of the (111) peak was much higher than (121) peak, which is different in comparison to the standard (FIG. 3A).

Figure 3B:
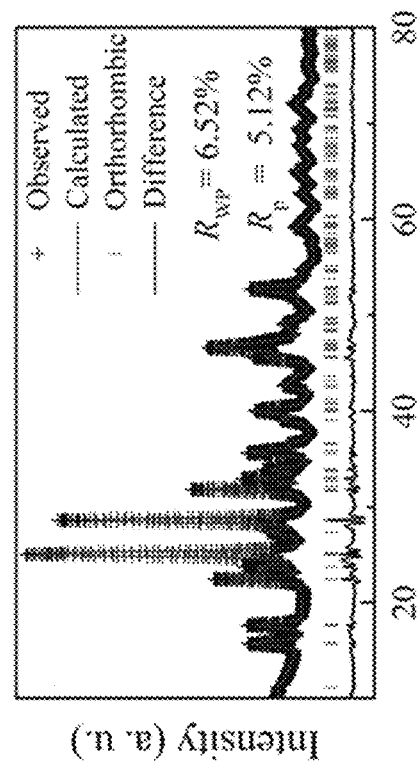
FIG. 3B is a plot showing the Rietveld refined XRD patterns of the as-prepared $Bi_2S_3$.

The corresponding Rietveld refined profile was fitted well with the experimental data (FIG. 3B).

Figure 4:
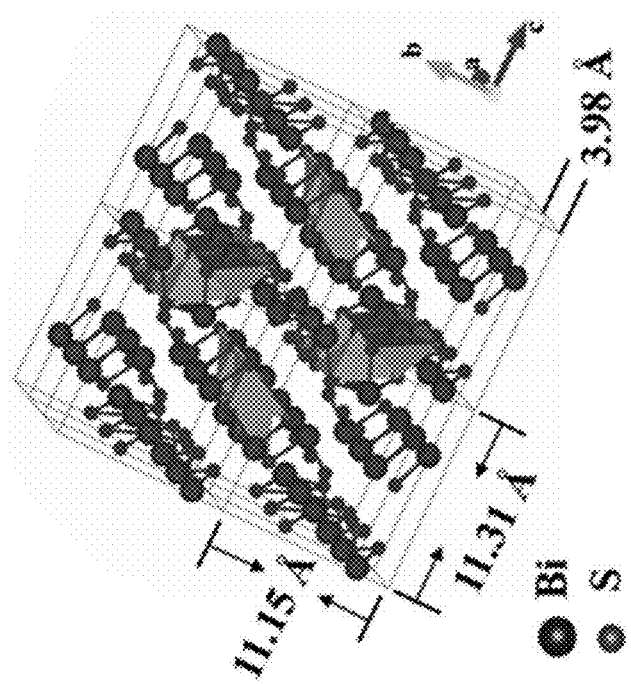
FIG. 4 refers to a schematic illustration of an orthorhombic structure of $Bi_2S_3$.

Lattice parameters of a=3.98 Å, b=11.15 Å, and c=11.31 Å were labeled in FIG. 4. As illustrated in FIG. 4, the crystal structure is composed of [$Bi_4S_6$] ribbon-like building blocks parallel to the c-axis, and a mass of ribbons forming a layer perpendicular to the a-axis. The layers are connected with each other via weak van der Waals interactions which is responsible for the rupture of the crystals. The SEM image in FIG. 5A showed a grainy morphology composed of aggregates of primary particles with an average diameter of 20-50 nm. This is probably ascribed to the nanocrystalline phase formed during the HEMM process. The TEM image in FIG. 5B clearly demonstrated the nanoscale aggregate crystallites (~200 nm) of $Bi_2S_3$. SAED analysis (insert of FIG. 5B) can be indexed to the (122), (200), (031) and (111) diffractions, indicating a single crystalline character of the $Bi_2S_3$ nanoparticles.

Figure 6A:
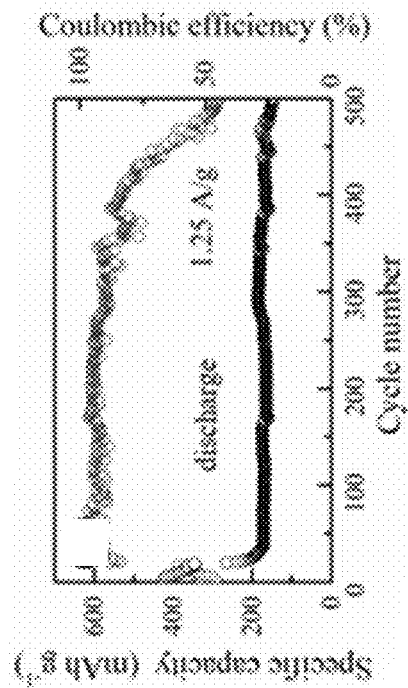
FIG. 6A is a plot of specific capacity against cycle number showing the cycling performance of a Zn—$Bi_2S_3$ battery with a high concentration salt solution as electrolyte at 1 A $g^{-1}$.
Figure 6B:
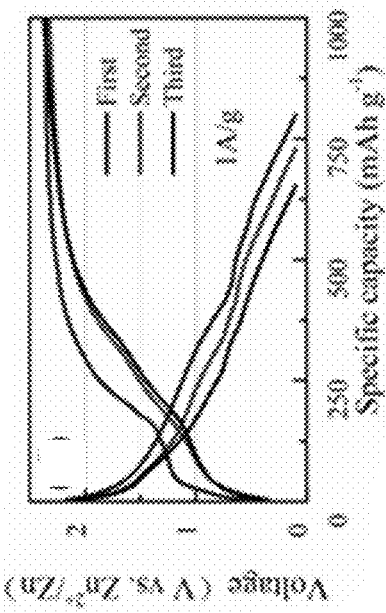
FIG. 6B is a plot of specific capacity against cycle number showing the cycling performance of the Zn—$Bi_2S_3$ battery with a high concentration salt solution as electrolyte at 1.25 A $g^{-1}$.

The electrochemical performances of a Zn—$Bi_2S_3$ battery with a high concentration salt electrolyte of 1 mol $kg^{-1}$ $Zn(TFSI)_2$ and 21 mol $kg^{-1}$ LiTFSI were studied. The use of a high concentration salt solution as the electrolyte may have the advantages of high coulombic efficiency (CE) and water retainability, which may be associated with the dissolution of the cathode material. With the use of the high concentration salt solution as the electrolyte, the battery delivered a high capacity in the first few cycles which is much larger than the theoretical capacity (FIGS. 6A and 6B). This may be ascribed to the solid-electrolyte interphase (SEI) formation at the electrode from the "water in salt" electrolyte. However, the capacity faded rapidly at around the first forty cycles. The sharp decrease in the capacity may be mainly due to the volume change, pulverization of the $Bi_2S_3$ cathode, and the possible dissolution of sulfur, as well as the irreversible side reactions.

Figure 6C:
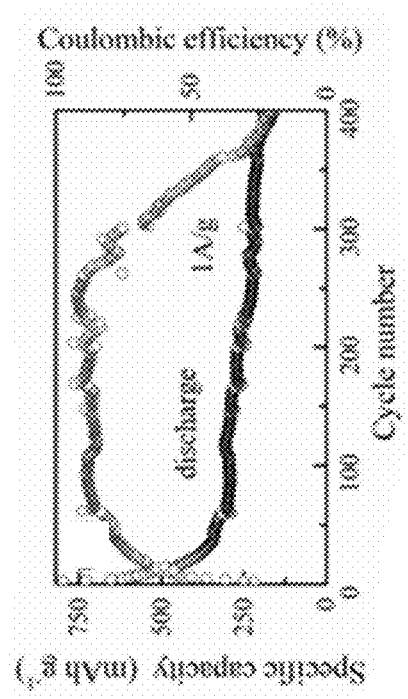
FIG. 6C is a plot of specific capacity against cycle number showing the cycling performance of the Zn—$Bi_2S_3$ battery with a high concentration salt solution as electrolyte at 2 A $g^{-1}$.
Figure 6D:
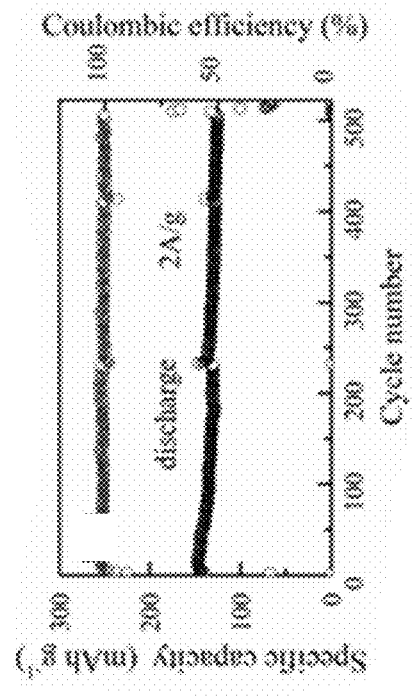
FIG. 6D is a plot of voltage against specific capacity showing galvanostatic discharge/charge curves of the $Bi_2S_3$ electrode at first, second, and third cycle at 1 A $g^{-1}$.
Figure 6F:
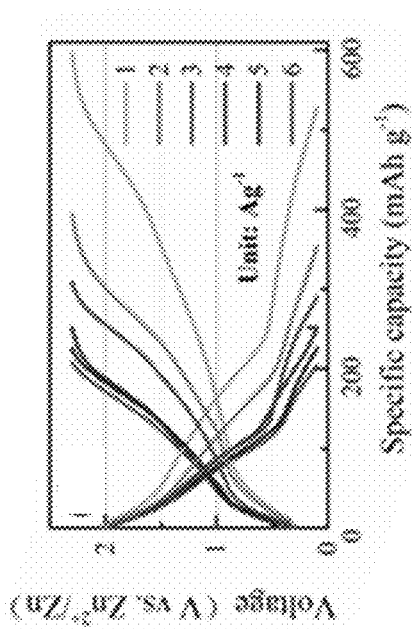
FIG. 6F is a plot of voltage against specific capacity showing corresponding cycle profile of the Zn—$Bi_2S_3$ battery of FIG. 6E.
Figure 6E:
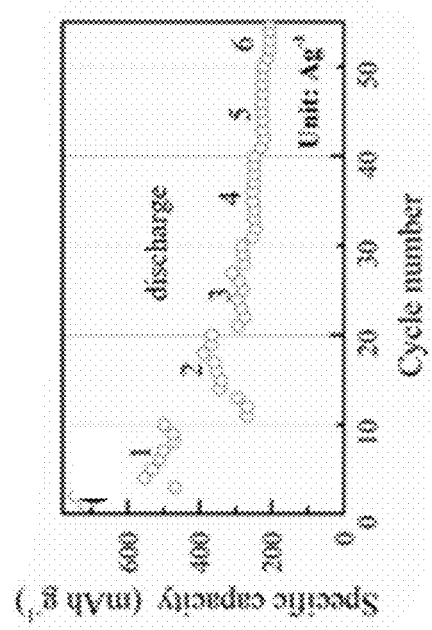
FIG. 6E is a plot of specific capacity against cycle number showing rate performance of the Zn—$Bi_2S_3$ battery from 1 to 6 A $g^{-1}$.

The initial discharge capacity was 799.3 with CE of 26.5% at 1 A $g^{-1}$, and 423.8 mAh $g^{-1}$ with CE of 45.8% at 1.25 A $g^{-1}$ respectively. Nevertheless, after 100 cycles, the discharge capacity was 293 (36.7% retention) and 170 mAh $g^{-1}$ (40.1% retention) respectively. When the Zn—$Bi_2S_3$ battery was tested at a higher rate of 2 A $g^{-1}$, it delivered a discharge capacity of 140 mAh $g^{-1}$ at first cycle and 125.6 mAh $g^{-1}$ (89.71% retention) after 500 cycles with CE reaching around 100% in all cycles (FIG. 6C). The corresponding galvanostatic discharge/charge curves of the $Bi_2S_3$ electrode for selected cycles at 1 A $g^{-1}$ indicated low CE, capacity degradation, and ambiguous discharge plateau (FIG. 6D). In addition, the rate capacity of the Zn—$Bi_2S_3$ battery was not able to return to 1 A $g^{-1}$ upon subjecting to the rate capability test from 1 to 6 A $g^{-1}$, indicating the poor rate capability of the Zn—$Bi_2S_3$ battery (FIG. 6E). The corresponding cycle profile is also given in FIG. 6F. It can be concluded that the capacity of the $Bi_2S_3$ cathode is far from steady at low rate, and the damage to the $Bi_2S_3$ electrode including volume expansion, pulverization, and simultaneously dissolution of sulfide is significant and cannot be recovered.

Figure 6H:
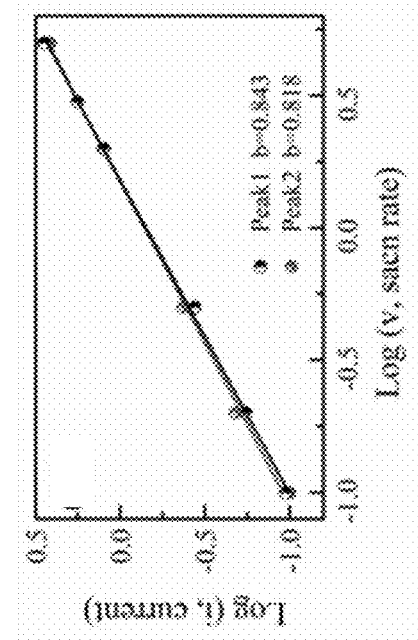
FIG. 6H is a plot of log(i) against log(v) corresponding to FIG. 6G.
Figure 6G:
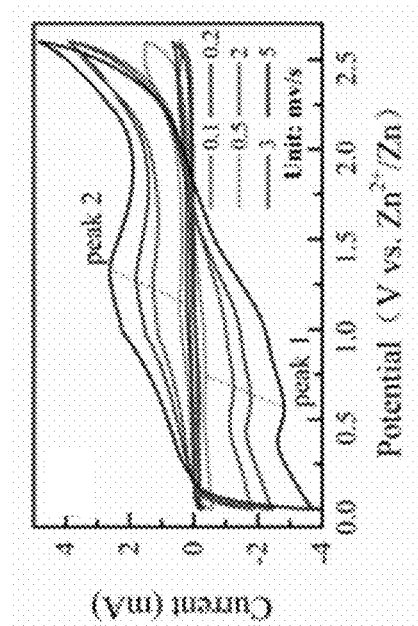
FIG. 6G is a cyclic voltammogram showing cyclic voltammetry curves of the $Bi_2S_3$ electrode at different scan rates.

The electrochemical kinetics and cyclic voltammetry (CV) curves of the $Bi_2S_3$ electrode were measured at various scan rates from 0.1 to 5 mV $s^{-1}$. The CV curves exhibited similar patterns and gradually broad peaks (FIG. 6G). The capacitive effects of the Zn—$Bi_2S_3$ battery were analyzed based on the CV data using the following equation:

$$i=av^b \quad (1)$$

where the current i follow the power law relationship with the scan rate v, a and b are adjustable parameters. The b value has well-defined conditions: 0.5 is representative of diffusion-limited controlled electrochemical process, and 1.0 a capacitive process. The b values obtained from a plot of log(i) versus log(v) for the redox peaks are 0.84 and 0.82 (FIG. 6H), suggesting a predominantly capacitive behavior in the $Bi_2S_3$ cathode for Zn storage.

To overcome the aforementioned issues, one approach may be disposing a layer of conductive polymer preferably a conductive polymer containing an ionic liquid on the active material of the cathode. In this example, the conductive polymer is PEDOT:PSS.

PSS (MW~400,000 Da) is water soluble, whereas PEDOT (MW~1000-2500 Da) is insoluble. By Coulombic attractions, PEDOT chains adhere to segments of the PSS chains via the sulfonate groups acting as dopants. In the PH1000 dispersion (i.e. PEDOT:PSS), these ionic complexes form a colloidal dispersion with coiled and globular structures in water where the hydrophilic PSS-rich shell wraps around the hydrophobic PEDOT-rich core against water. However, the insulating PSS shells also act as a barrier for charge transport between the PEDOT-rich domains resulting in low conductivity of the pristine film. To boost up the conductivity of the pristine polymer, an ionic liquid such as [EMIM]$PF_6$ may be employed in the polymer.

Figure 7:
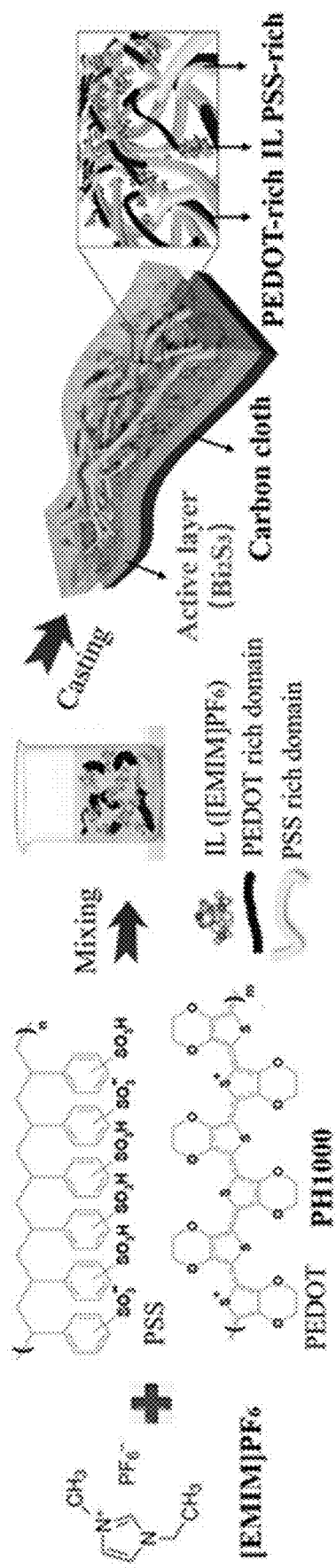
FIG. 7 is a schematic diagram showing the preparation process of the [EMIM]$PF_6$-PEDOT:PSS film.
Figure 8:
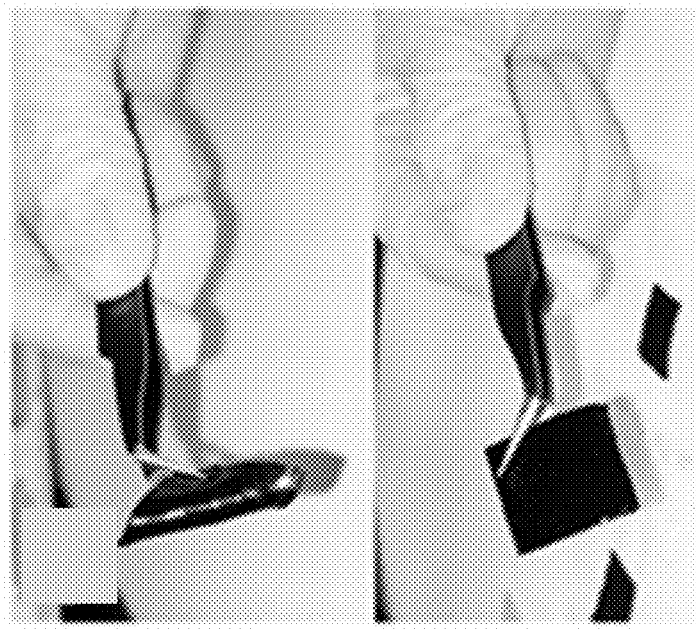
FIG. 8 is an optical image showing the film of FIG. 7 under a bent and a flat condition.
Figure 9A:
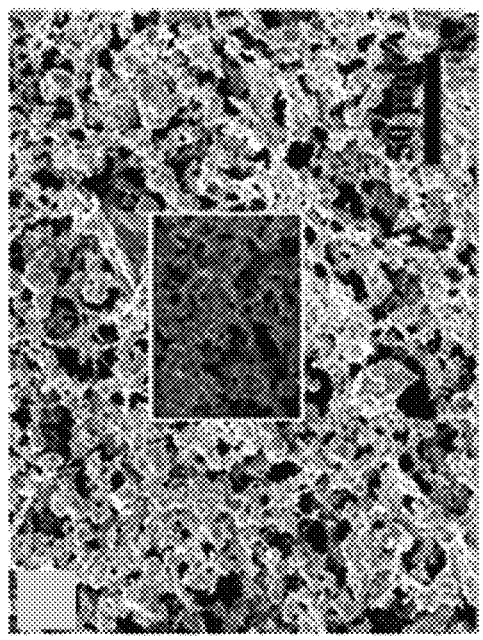
FIG. 9A is a SEM image showing the morphology of the film of FIG. 7.
Figure 9B:
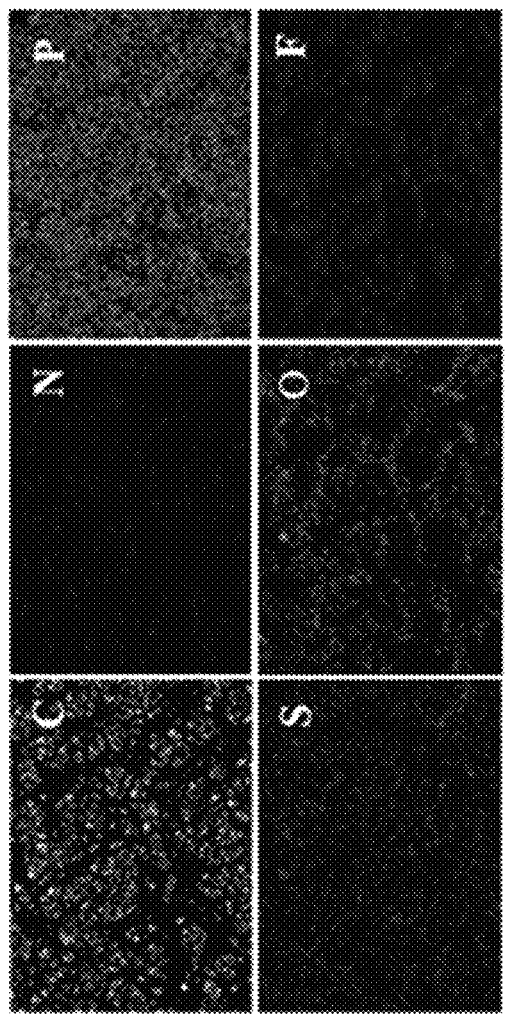
FIG. 9B is an EDS mapping of the elements of C, N, P, S, O, and F corresponding to the SEM image of FIG. 9A.

The preparation procedures for the IL-containing polymer are simple solution processing and casting, which is shown schematically shown in FIG. 7. Briefly, IL additive [EMIM]$PF_6$ was mixed with PH1000 to obtain a paste, which was then casted onto a substrate such as carbon cloth. After drying, the film was annealed to form both highly conductive and flexible film as shown in FIG. 8. As shown in FIG. 9A, the morphology of the film was an ant-nest-like structure consisting of numerous tiny channels with diverse sizes, which may be attributed to unprecedented ion transport ability. The corresponding element mapping as shown in FIG. 9B clearly revealed that the constitutional elements including O, S, N, F, P, and C are uniformly distributed in the [EMIM]$PF_6$-PEDOT:PSS film.

Figure 9C:
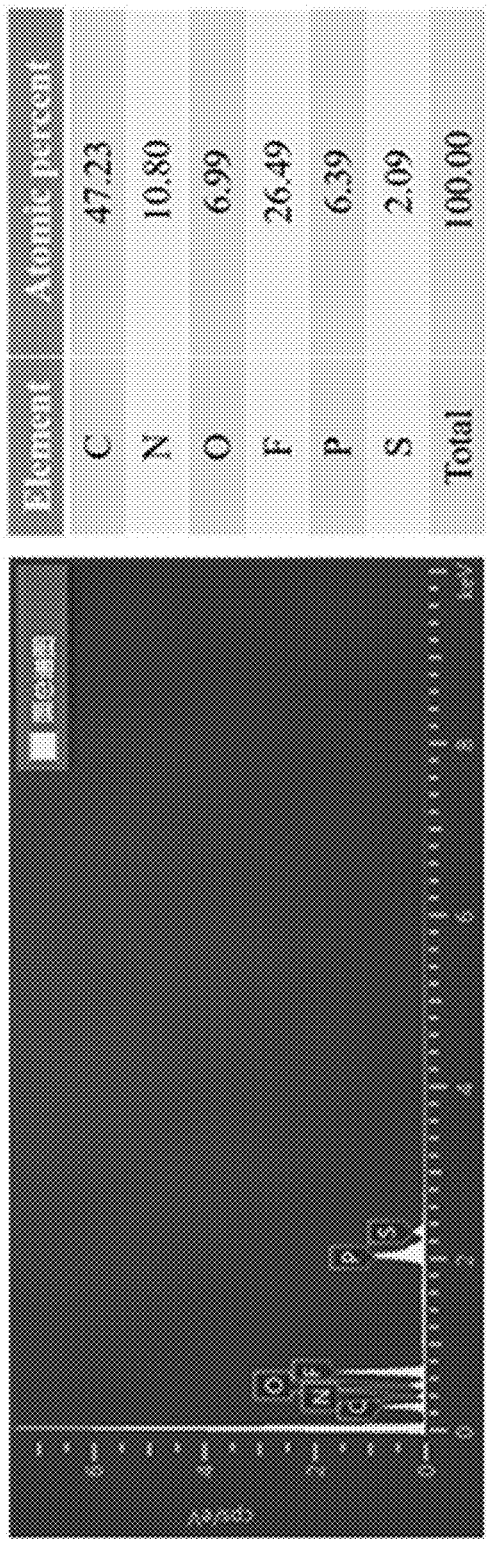
FIG. 9C is an EDS spectrum of the selected area of the SEM image of FIG. 9A.

EDS spectrum on the selected area of the [EMIM]$PF_6$-PEDOT:PSS film provided a good match with the initial atomic composition ratio (FIG. 9C). Raman spectroscopy is employed to further characterize the conformational changes of the PEDOT:PSS film upon [EMIM]$PF_6$ doping (FIG. 9D). Apparently the Raman peak at around 1434 $cm^{-1}$ was narrower and showed a red shift, suggesting that a large proportion of the resonant structure of the PEDOT chains was switched from the benzoid structure in the pristine PEDOT:PSS films to the more planar quinoid structure in [EMIM]$PF_6$-PEDOT:PSS film. The additional peaks at 1347 $cm^{-1}$ and 1474 $cm^{-1}$ was attributed to the [EMIM]$^+$ cation doped in the pristine PEDOT:PSS, which further confirms the changed resonant structure of the PEDOT chains.

Typically, weak bands located at 1265 $cm^{-1}$ and 1379 $cm^{-1}$ indicate C—C inter-ring stretching and single C—C bond stretching. The 1580 $cm^{-1}$ and 1445 $cm^{-1}$ bands were attributed to the antisymmetric and symmetric stretching vibrations of C=C bonds from neighboring thiophene rings. Moreover, the intensity ratio of I(1580 $cm^{-1}$)/I(1445 $cm^{-1}$) for [EMIM]$PF_6$-PEDOT:PSS was much higher than that for the pristine PEDOT:PSS, revealing that the former has longer conjugation chains in the PEDOT domains. These phenomena are conducive to improving conductivity of the PEDOT:PSS upon [EMIM]$PF_6$ doping as a result of partially removing its insulating PSS and increasing the conjugation lengths of the PEDOT chains.

The interplay between PEDOT:PSS and [EMIM]$PF_6$ was qualitative by FTIR (FIG. 9E). The typical peaks of PEDOT:

PSS may be indicated as follows: 1240 cm$^{-1}$ by C—O—C stretching mode, typically used to identify PEDOT; 1130 and 1118 cm$^{-1}$ by S—O vibrations and 1010 cm$^{-1}$ by S-phenyl vibration in sulfonic acid group of PSS; 1552 cm$^{-1}$ by C=C vibrations, 1369 by C—C vibrations and 992, 857 and 706 cm$^{-1}$ by C—S vibrations of the thiophene backbone in PEDOT. For the [EMIM]PF$_6$-PEDOT:PSS, the weak peaks in the range of 1324-1468 cm$^{-1}$ were assigned to the C=N stretches; whereas the peak of P—F asymmetric stretch shifted from the standard 838 cm$^{-1}$ to 816 cm$^{-1}$ suggested the strong intermolecular interaction between PEDOT:PSS chains and [EMIM]PF$_6$.

In general, the stretching modes of PEDOT:PSS in the [EMIM]PF$_6$-PEDOT:PSS film is associated with the ionic liquid content (10 wt %). FIG. 9F illustrates the relationship between a PEDOT:PSS film prepared from a PH1000 aqueous solution with a conductivity of 2.4 S cm$^{-1}$. As shown in FIG. 9F, the conductivity of the PEDOT:PSS film increased from 400 to 1700 S cm$^{-1}$ as the [EMIM]PF$_6$ concentration increased from 10 to 30% wt. %. In particular, the maximum conductivity value was determined to be 2300 S cm$^{-1}$ at [EMIM]PF$_6$ concentration of 40 wt. %.

Figure 10:
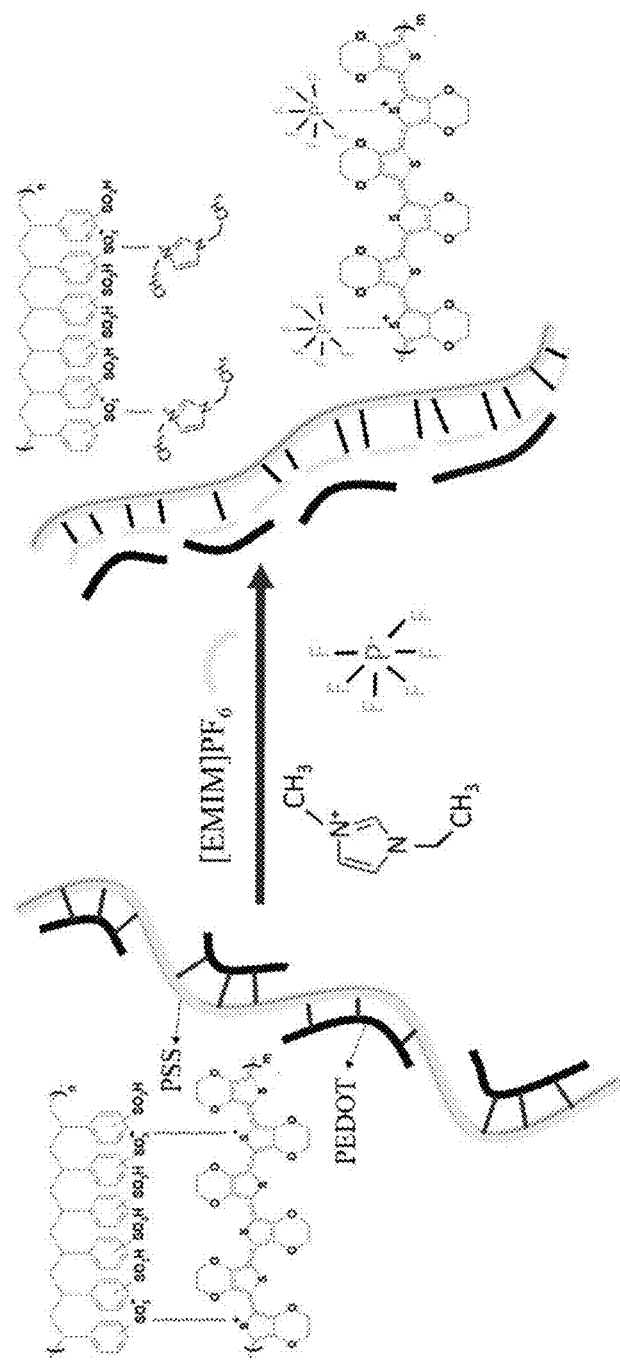
FIG. 10 is a schematic illustration showing the effect of [EMIM]$PF_6$ on the interaction between the PSS and PEDOT chains.

The effect of the IL on the PEDOT:PSS may be explained as illustrated in the inset of FIG. 9F, and FIG. 10. As mentioned above, the PH1000 dispersion has a core-shell structure where the PSS shell wraps around the PEDOT-rich core via Coulombic attractions. After adding [EMIM]PF$_6$ (i.e. IL) into the PEDOT:PSS system, the IL (as a result of its small size) interacts with both the positively charged PEDOT and the negatively charged PSS chains, resulting in a charge screening effect that weakens the Coulombic interactions between the PEDOT and PSS chains, thereby changing the conformation of the PEDOT and PSS chains (FIG. 10). As a consequence, the PEDOT chains are partially isolated from the highly coiled PSS chains, forming more planar and larger PEDOT-rich domains, which promotes delocalization of charge carriers and leads to an increase of conductivity. This is also in good agreement with the aforementioned Raman and FTIR results. In addition, the unique morphology of the 3D interconnected porous network may further contribute to the ultrahigh-conductivity of the film.

Figure 11B:
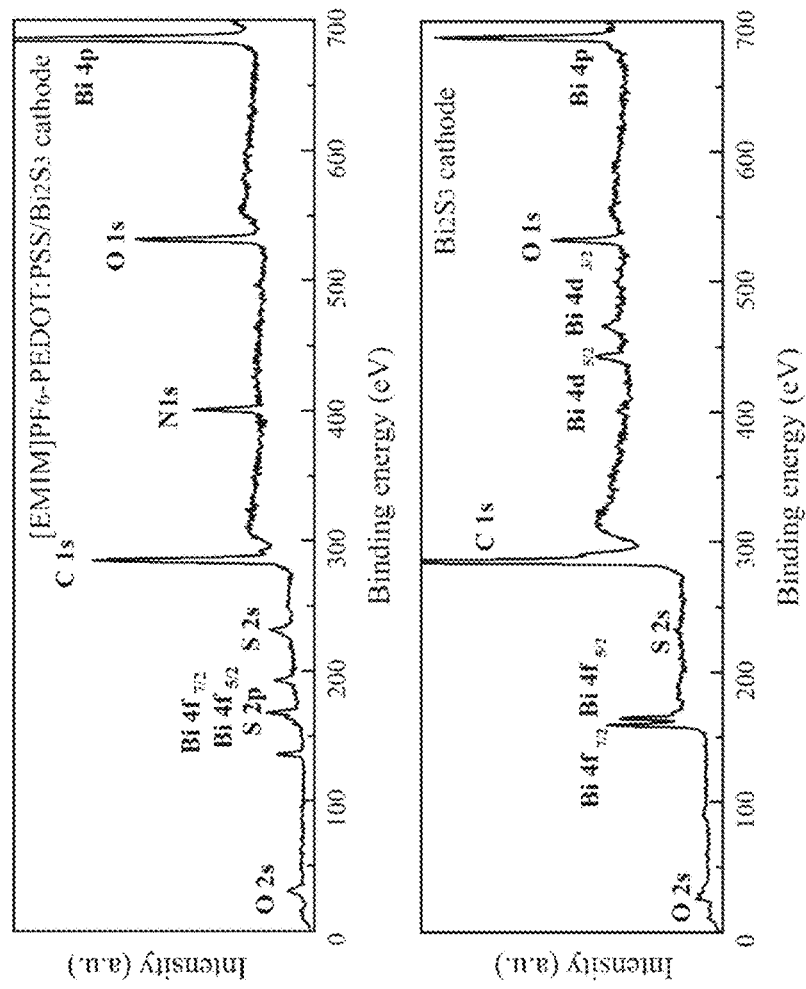
FIG. 11B is a pair of XPS spectra of the [EMIM]$PF_6$-PEDOT:PSS/$Bi_2S_3$ cathode and the $Bi_2S_3$ cathode.
Figure 11A:
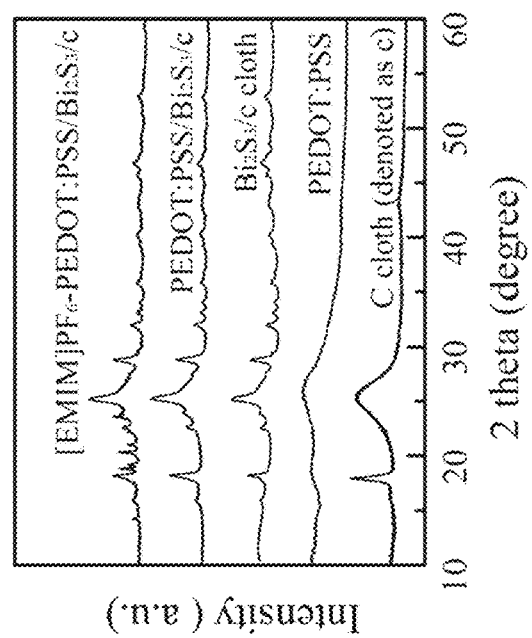
FIG. 11A is a plot showing XRD patterns of the [EMIM]$PF_6$-PEDOT:PSS/$Bi_2S_3$@carbon cloth electrode.

The [EMIM]PF$_6$-PEDOT:PSS/Bi$_2$S$_3$ cathode may be fabricated by casting the [EMIM]PF$_6$-PEDOT:PSS film over the Bi$_2$S$_3$ active material. The as-obtained electrode may be characterized by XRD spectroscopy and photoelectron spectroscopy (XPS). The corresponding spectra are shown in FIGS. 11A and 11B, respectively.

Figure 12A:
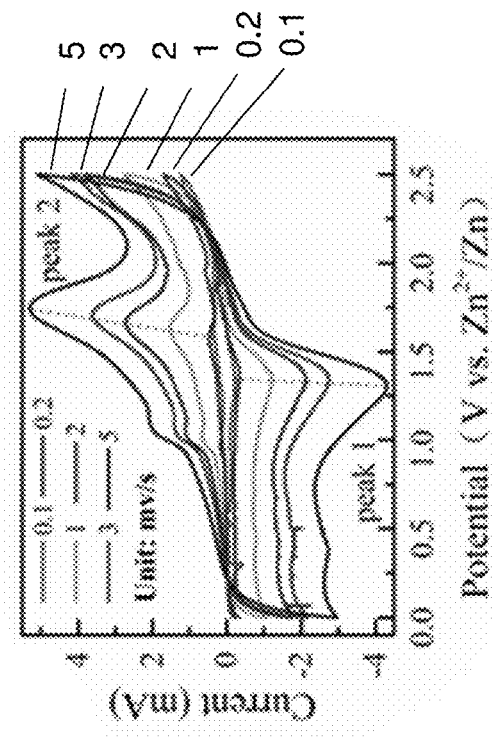
FIG. 12A is a cyclic voltammogram showing the CV curves of a Zn-[EMIM]$PF_6$-PEDOT:PSS/$Bi_2S_3$ battery at a scan rate of 2 mV $s^{-1}$ from 0 to 2.5 V.
Figure 12B:
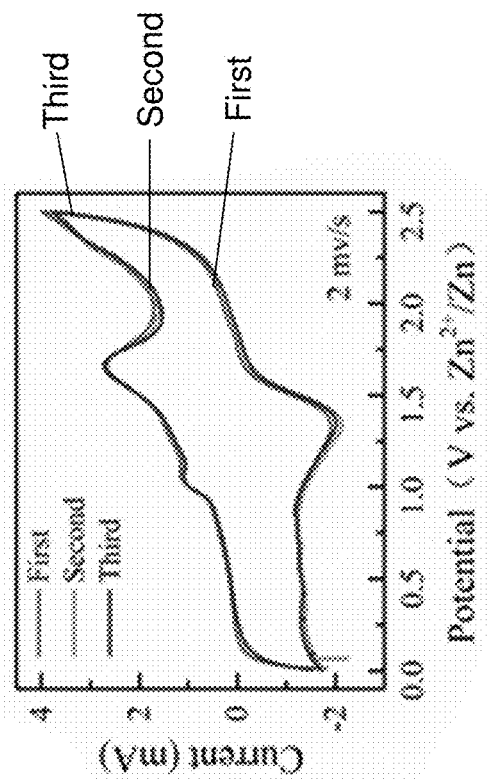
FIG. 12B is a cyclic voltammogram showing the CV curves of the Zn-[EMIM]$PF_6$-PEDOT:PSS/$Bi_2S_3$ battery of FIG. 12A at the scan rates of 0.1 to 5 mV $s^{-1}$.
Figure 12C:
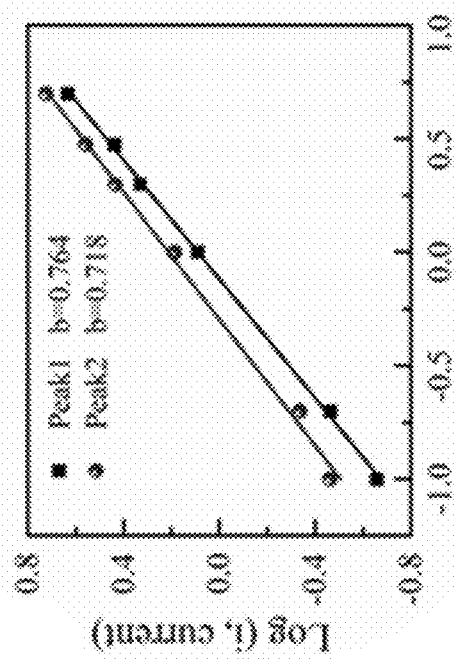
FIG. 12C is a plot of log(i) against log(v) corresponding to FIG. 12B.

The electrochemical performances of the [EMIM]PF$_6$-PEDOT:PSS/Bi$_2$S$_3$ were studied and the results are shown in FIGS. 12A to 12C and FIGS. 13A to 13C. As shown in FIG. 12A, the CV data of the [EMIM]PF$_6$-PEDOT:PSS/Bi$_2$S$_3$ cathode for the first cycle exhibited a distinct anode peak at around 1.75 V and a corresponding cathodic peak at around 1.4 V at a scan rate of 2 mV s$^{-1}$. In particular, the intensities of the redox peak pairs of the second and the third cycle were highly assemble to that of the first cycle, suggesting the superior reversibility of the cathode material. Moreover, the high-rate capability was also investigated via CV at the scan rate from 0.1 to 5 my/s. As shown in FIG. 12B, the current strengths of the redox peaks increased with the increase of scan rates without substantially changing the shape profile. With reference to Equation (1), the b values of peak 1 and 2 were determined to be 0.76 and 0.72, respectively, demonstrating that surface-controlled behaviors of the Zn-[EMIM]PF$_6$-PEDOT:PSS/Bi$_2$S$_3$ battery is responsible for the fast kinetics during the discharge/charge process (FIG. 12C).

Figure 13A:
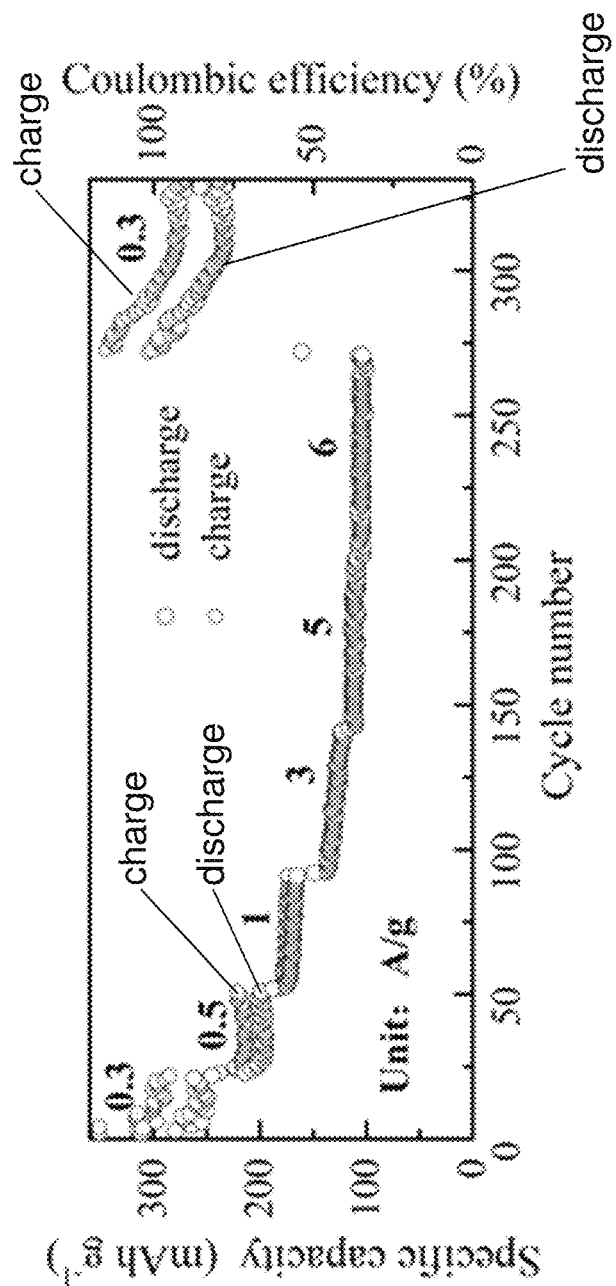
FIG. 13A refers to a plot showing the rate capability of the Zn-[EMIM]$PF_6$-PEDOT:PSS/$Bi_2S_3$ battery of FIG. 12A.
Figure 13B:
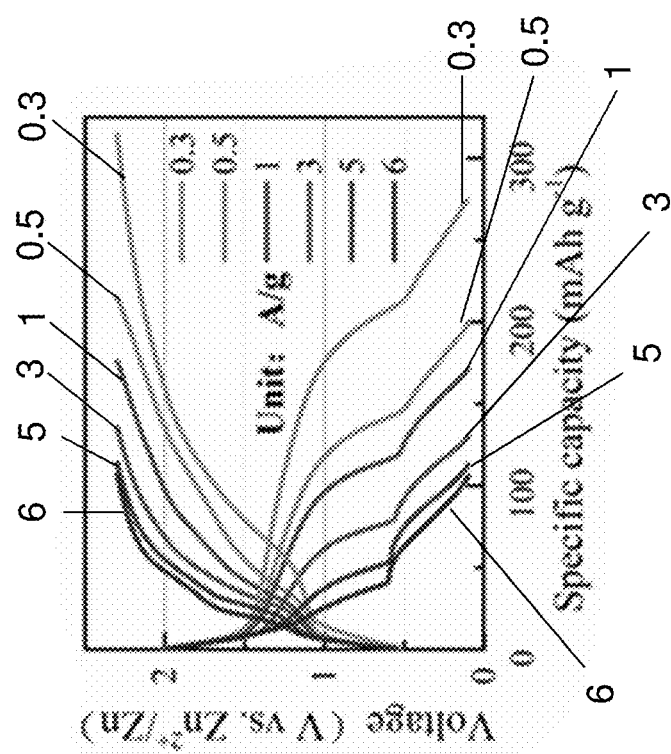
FIG. 13B is a plot of voltage against specific capacity showing the discharge/charge profiles of the Zn-[EMIM]$PF_6$-PEDOT:PSS/$Bi_2S_3$ battery of FIG. 12A at the current density from 0.3 to 6 A $g^{-1}$.
Figure 13C:
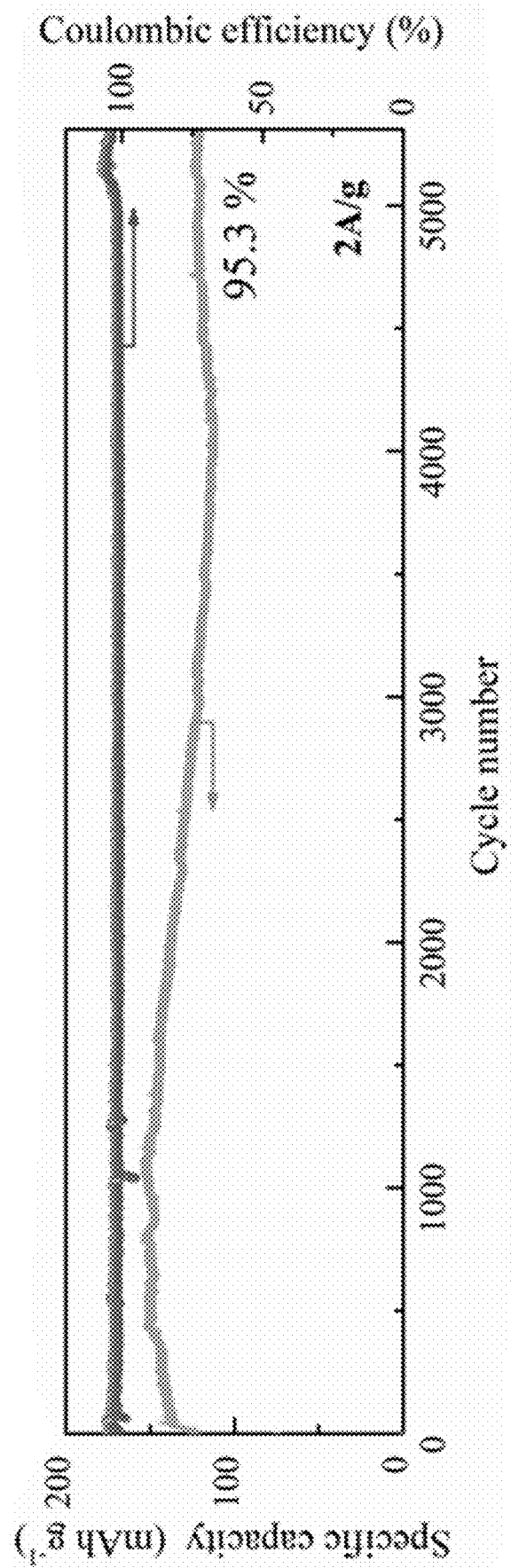
FIG. 13C refers to a plot showing the long-term cycling performance of the Zn-[EMIM]$PF_6$-PEDOT:PSS/$Bi_2S_3$ battery of FIG. 12A at 2 A $g^{-1}$.

FIG. 13A displayed the rate performance of the [EMIM]PF$_6$-PEDOT:PSS/Bi$_2$S$_3$ cathode. As shown, the cathode delivered discharge capacities of 275, 200, 172, 130, 115, and 105 mAh g$^{-1}$ at the current densities of 0.3, 0.5, 1, 3, 5, and 6 A g$^{-1}$, respectively. Impressively, when the current rate returned to 0.3 A g$^{-1}$, the capacity of the cathode almost recovered to the initial value, manifesting superior rate capability of the composite cathode (i.e. [EMIM]PF$_6$-PEDOT:PSS/Bi$_2$S$_3$ cathode) compared to the Bi$_2$S$_3$ cathode. Moreover, when the current density increases, the corresponding cycle profiles showed an insignificant overpotential difference and stable plateaus located at 1.4 V which is in accordance with the cathodic peak (FIG. 13B). For the long-term cycling stability, the composite cathode showed a discharge capacity of 131 mAh g$^{-1}$ and a cycle retention of 95.3% up to 5000 cycles with the corresponding CE almost approaching 100% at 2 A g$^{-1}$ (FIG. 13C).

Figure 14A:
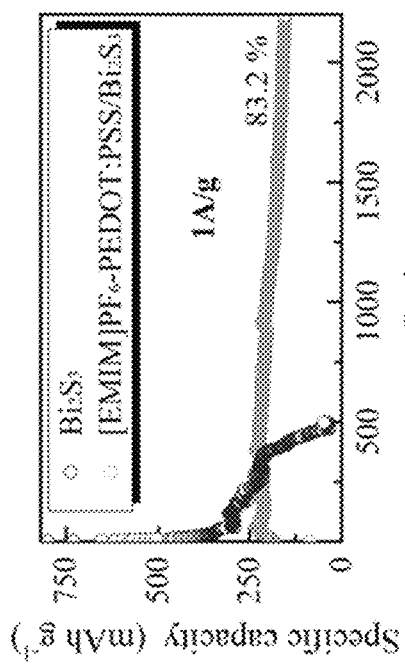
FIG. 14A is a plot of specific capacity against cycle numbers showing cycling stability of the Zn-[EMIM]$PF_6$-PEDOT:PSS/$Bi_2S_3$ battery and the Zn—$Bi_2S_3$ battery at 1 A $g^{-1}$.
Figure 14B:
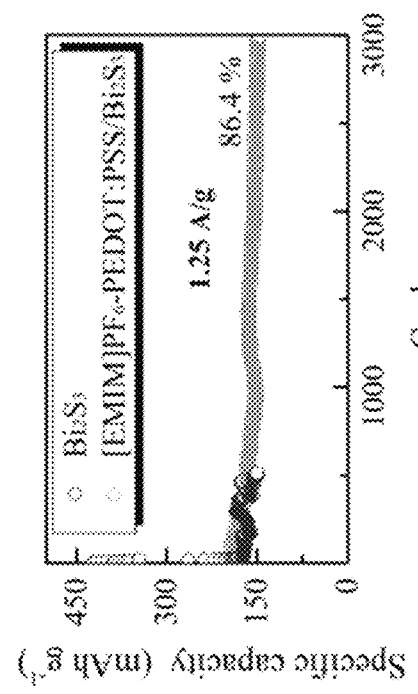
FIG. 14B is a plot of specific capacity against cycle numbers showing cycling stability of the Zn-[EMIM]$PF_6$-PEDOT:PSS/$Bi_2S_3$ battery and the Zn—$Bi_2S_3$ battery at 1.25 A $g^{-1}$.

Furthermore, the cycling stability of the composite battery (i.e. Zn-[EMIM]PF$_6$-PEDOT:PSS/Bi$_2$S$_3$ battery) and the pristine Zn—Bi$_2$S$_3$ battery at 1 and 1.25 A g$^{-1}$ was compared (FIGS. 14A and 14B). In the process of cycling, the capacity of the Zn—Bi$_2$S$_3$ battery degraded rapidly, which is ascribed to the continuous SEI breakage and reformation caused by grain pulverization and sulfur dissolution, which exhaust the electrolyte and loss of cathode integrity as well as interfacial chemistry stability. In contrast, the Zn-[EMIM]PF$_6$-PEDOT:PSS/Bi$_2$S$_3$ battery showed extraordinary stability. Specifically, the [EMIM]PF$_6$-PEDOT:PSS film may make main contribution to incorporate structural integrity with stable in interfacial chemistry for the composite battery, such that the battery may be capable of showing superior kinetics process, excellent rate capability and remarkable stability.

Figure 15A:
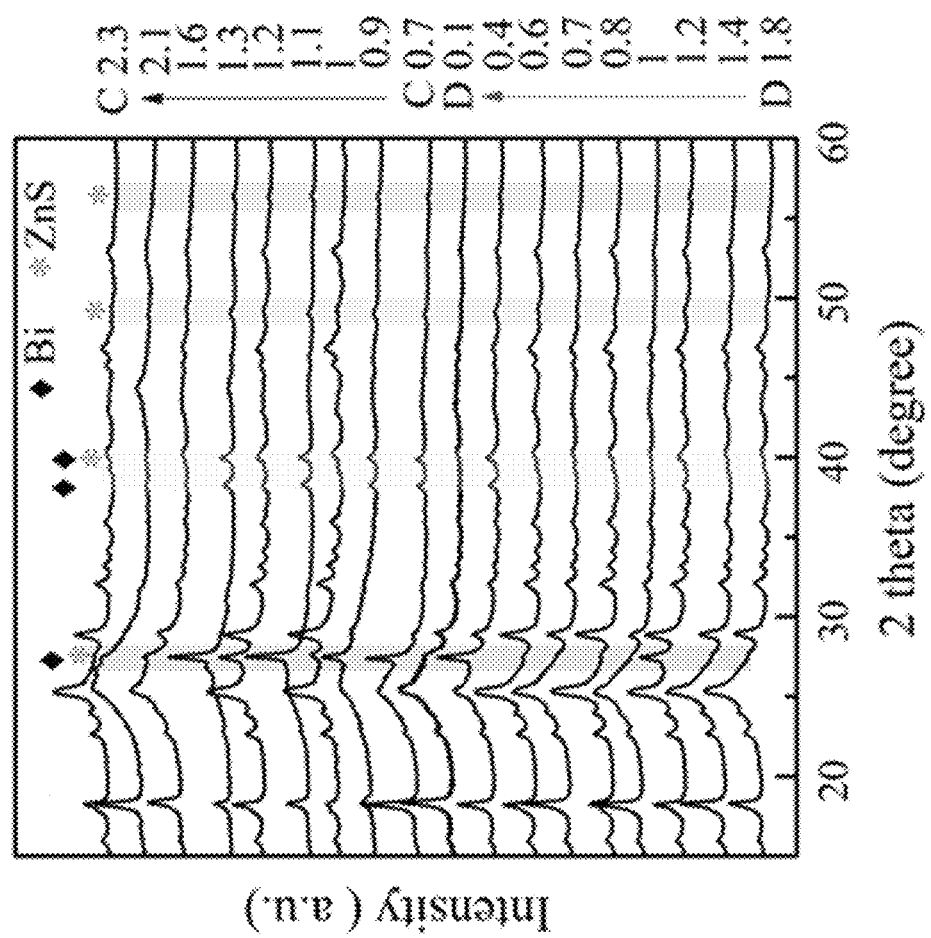
FIG. 15A is a plot showing the ex-situ XRD patterns of [EMIM]$PF_6$-PEDOT:PSS/$Bi_2S_3$ cathode collected at different states.
Figure 15B:
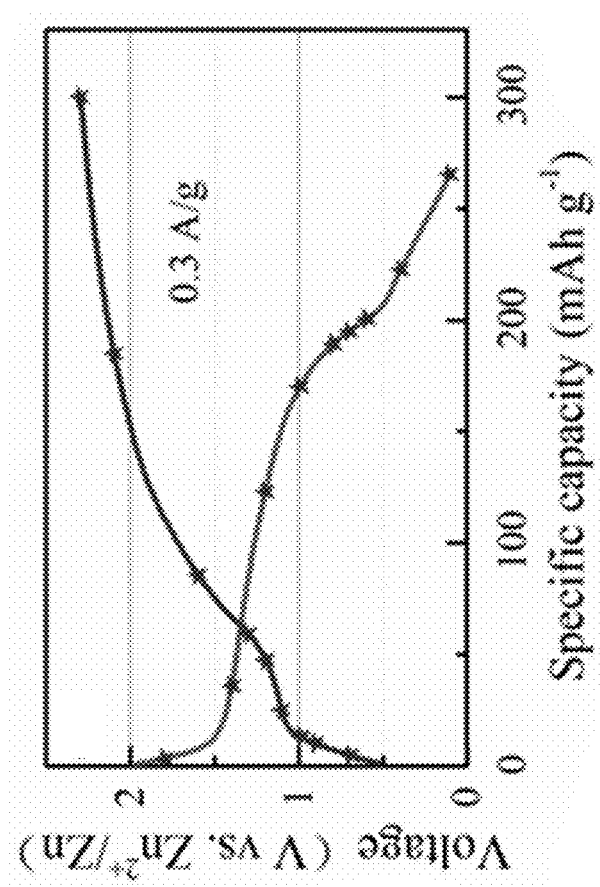
FIG. 15B is a plot of voltage against specific capacity showing the discharge/charge profile of the [EMIM]$PF_6$-PEDOT:PSS/$Bi_2S_3$ cathode at 0.3 A $g^{-1}$ for the third cycle.

To explore the reaction mechanism of Bi$_2$S$_3$ in the discharge/charge process, ex-situ XRD patterns (FIG. 15A) were conducted at the selected states marked in FIG. 15B within the range of 0.1-2.3V. During the third discharge cycle (1.8→0.1), the characteristic peaks of ZnS at 26.9, 39.6, and 47.56° gradually appeared, which can be assigned to (012), (102), and (110) reflections of the crystallographic planes of wurtzite phase (hexagonal α-ZnS structure), respectively. In the meantime, new peaks emerged at 27.16, 37.95, and 39.61° corresponding to the (012), (104) reflections of Bi phase, respectively. In the subsequence charging process (0.7→2.3), the intensity of the emerging peaks indexed to the wurtzite and Bi phases gradually vanish upon Zn$^{2+}$ egress. Interestingly, when charging was finished at 2.3 V, the peaks were highly comparable to those of the original values, thereby confirming that there was the reversible electrode conversion reaction between Bi$_2$S$_3$ and wurtzite phase during the discharge/charge processes (FIG. 2B).

Figure 16B:
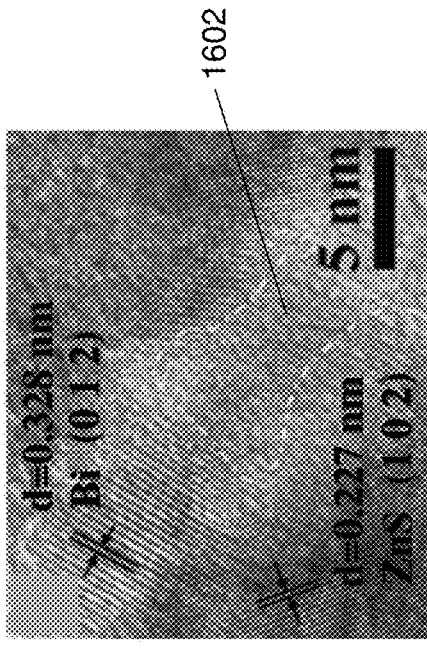
FIG. 16B is a high-resolution TEM image of FIG. 16A.
Figure 16C:
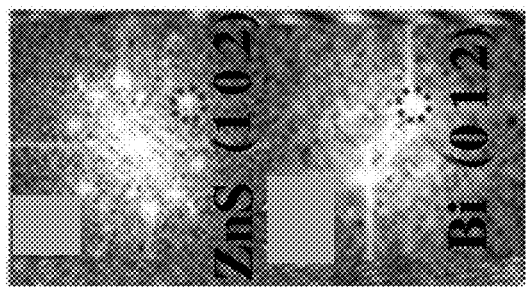
FIG. 16C shows the fast Fourier transformation (FFT) patterns for the selected areas of FIG. 16B.
Figure 16A:
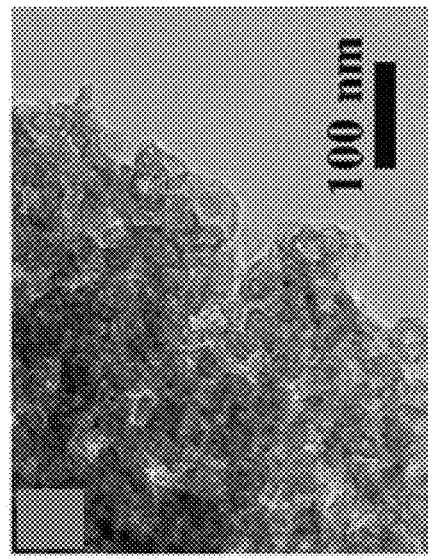
FIG. 16A is a TEM image of the [EMIM]$PF_6$-PEDOT:PSS/$Bi_2S_3$ cathode at fully discharged state after 3 cycles.

To further prove the existence of the wurtzite and Bi phases, TEM and HRTEM were performed on the cathode at fully discharged state. The TEM displayed a uniform nanoparticulate morphology revealing that the grains have a tendency to pulverize after forming the newly discharged product which is different from the pristine Bi$_2$S$_3$ (FIG. 16A). The corresponding lattice fringes of 0.328 and 0.227 nm are consistent with the (012) and (102) crystal planes of Bi and ZnS as evidenced by the XRD analysis, respectively (FIGS. 16B and 16C). The region (1602) indicated an amorphous PEDOT:PSS matrix.

Figure 17A:
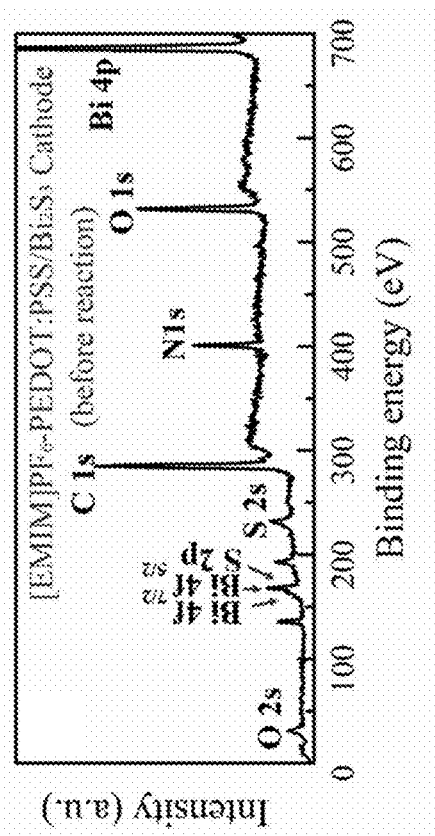
FIG. 17A shows the XPS spectrum of the [EMIM]PF$_6$-PEDOT:PSS/Bi$_2$S$_3$ cathode before being discharged.
Figure 17B:
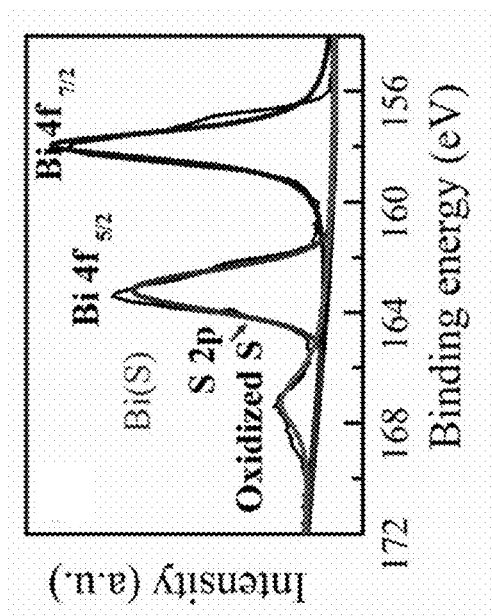
FIG. 17B shows the XPS core level spectra of Bi 4f$_{5/2}$ and Bi 4f$_{7/2}$ of the [EMIM]PF$_6$-PEDOT:PSS/Bi$_2$S$_3$ cathode before being discharged.
Figure 17C:
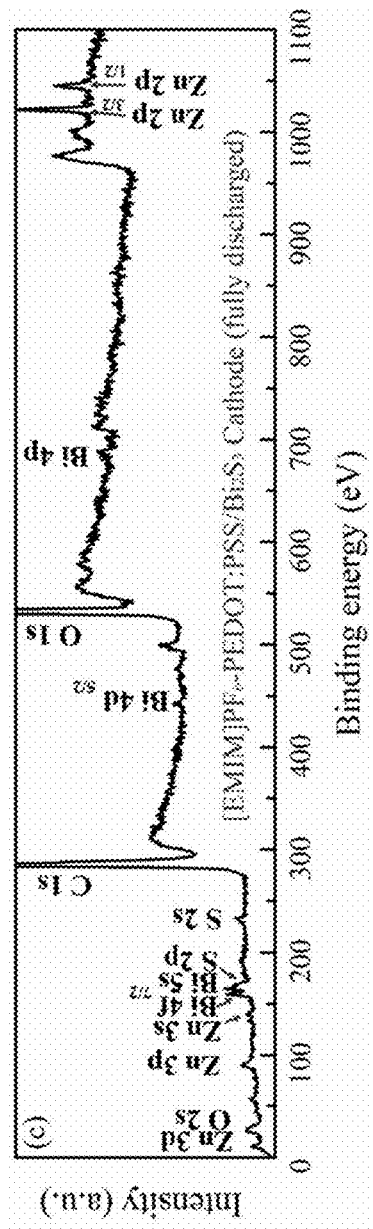
FIG. 17C shows the XPS spectrum of the [EMIM]PF$_6$-PEDOT:PSS/Bi$_2$S$_3$ cathode at fully discharged state after 3 cycles.
Figure 17D:
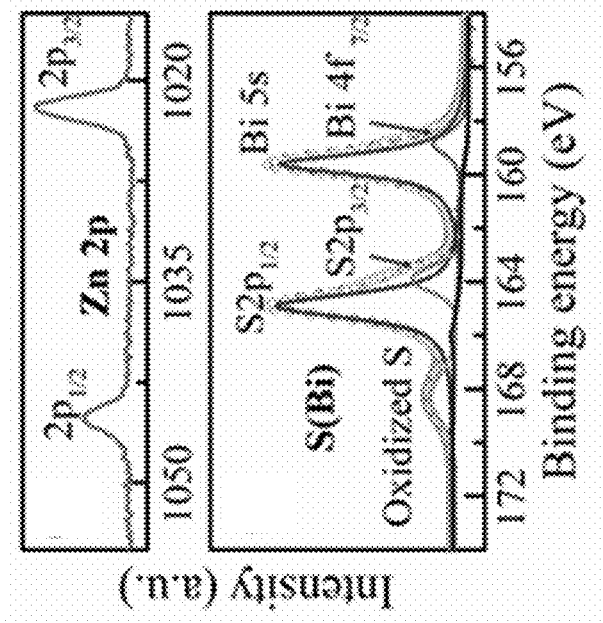
FIG. 17D shows the XPS core level spectra of Zn 2p and S(Bi) of the [EMIM]PF$_6$-PEDOT:PSS/Bi$_2$S$_3$ cathode at fully discharged state after 3 cycles.

The [EMIM]PF$_6$-PEDOT:PSS/Bi$_2$S$_3$ cathodes were further characterized in the original state and at the fully discharged state by XPS (FIGS. 17A to 17D). In comparison to the original cathode where the zinc signals were absent (FIGS. 17A and 17B), the cathode after reaction exhibited Zn 2P signals (FIGS. 17C and 17D). The binding energies of Zn $2p_{1/2}$ and $2p_{3/2}$ were located at 1044.8 and 1022.0 eV, respectively, whereas those for S $2p_{3/2}$ and $2p_{1/2}$ were observed at 164.0 and 165.1 eV, respectively (FIG. 17D). When the battery was discharged to 0.1 V, Bi $4f_{5/2}$ and Bi $4f_{7/2}$ derived from original $Bi_2S_3$ at 162.3 and 157.1 eV (FIG. 17B) were no longer obvious in FIG. 17D, whereas Bi 5s at 160 eV was noticeable. These results may be due to the formation of Bi phase. Based on above results, the chemical reaction of the rechargeable Zn-polymer coupled $Bi_2S_3$ battery (i.e. Zn-[EMIM]$PF_6$-PEDOT:PSS/$Bi_2S_3$ battery) with a high concentration salt solution can be expressed as:

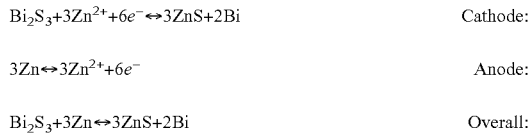

Cathode: $Bi_2S_3 + 3Zn^{2+} + 6e^- \leftrightarrow 3ZnS + 2Bi$

Anode: $3Zn \leftrightarrow 3Zn^{2+} + 6e^-$

Overall: $Bi_2S_3 + 3Zn \leftrightarrow 3ZnS + 2Bi$

The [EMIM]$PF_6$-PEDOT:PSS film is extremely stable during cycling tests and is thin enough for the purpose of investigating the change of $Bi_2S_3$ nanoparticles during the tests (FIGS. 18A to 18F, the arrows indicate the location of $Bi_2S_3$). The cross-sectional image of the [EMIM]$PF_6$-PEDOT:PSS film showed a porous skeleton representing the high levels of $Bi_2S_3$ utilization and full penetration of the electrolyte (the thickness of carbon cloth here is 410 μm) (FIG. 18G).

Figure 18B:
FIG. 18B is a top-view SEM image of the [EMIM]PF$_6$-PEDOT:PSS/Bi$_2$S$_3$ cathode of FIG. 18C after subjecting to 1000 discharge/charge cycles at 2 A g$^{-1}$.
Figure 18C:
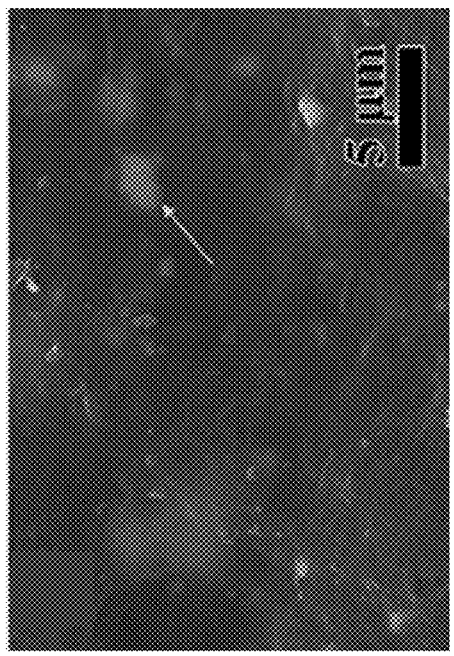
FIG. 18C is a top-view SEM image of the [EMIM]PF$_6$-PEDOT:PSS/Bi$_2$S$_3$ cathode of FIG. 18B after subjecting to 2000 discharge/charge cycles at 2 A g$^{-1}$.
Figure 18A:
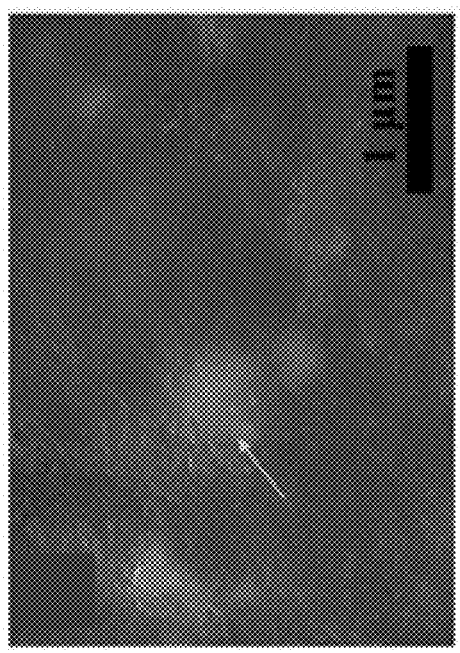
FIG. 18A is a top-view SEM image of the [EMIM]PF$_6$-PEDOT:PSS/Bi$_2$S$_3$ cathode after subjecting to 100 discharge/charge cycles at 2 A g$^{-1}$.
Figure 18E:
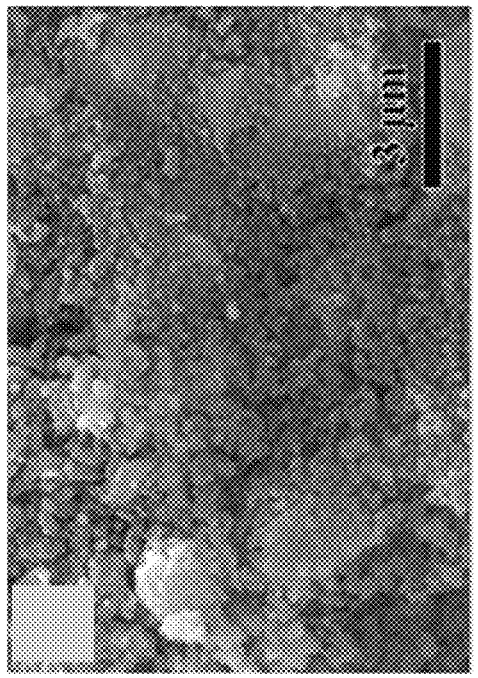
FIG. 18E is a top-view SEM image of the Bi$_2$S$_3$ cathode of FIG. 18D after subjecting to 1000 discharge/charge cycles at 2 A g$^{-1}$.
Figure 18D:
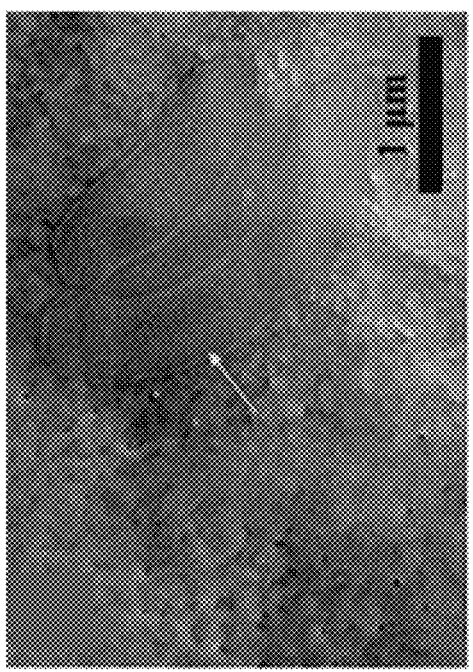
FIG. 18D is a top-view SEM image of a Bi$_2$S$_3$ cathode after subjecting to 100 discharge/charge cycles at 2 A g$^{-1}$.
Figure 18F:
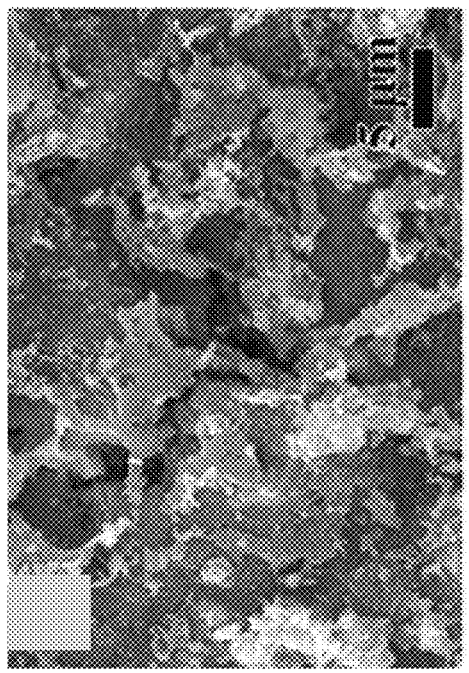
FIG. 18F is a top-view SEM image of the Bi$_2$S$_3$ cathode of FIG. 18E after subjecting to 2000 discharge/charge cycles at 2 A g$^{-1}$.
Figure 18G:
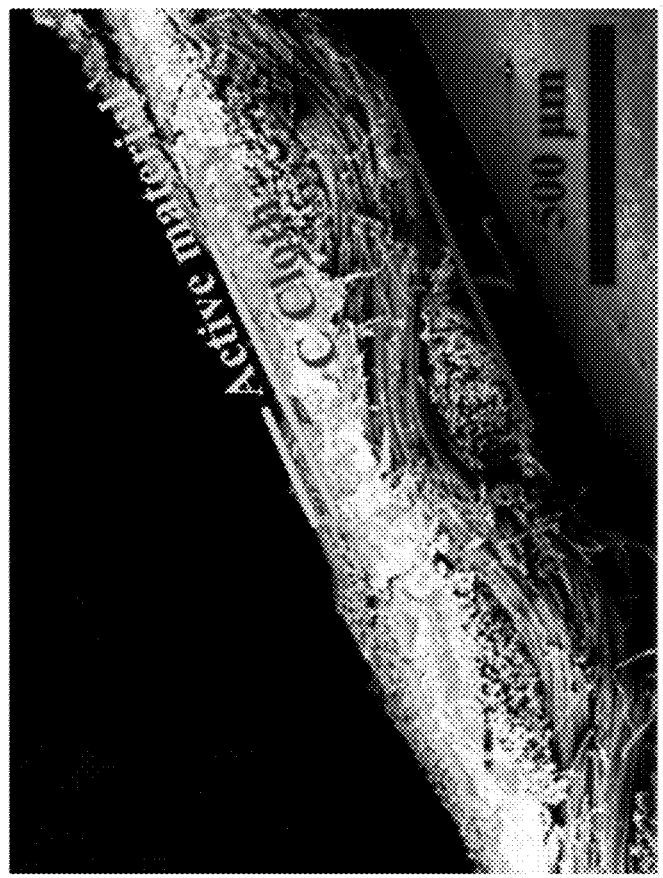
FIG. 18G is a cross-sectional SEM image of the [EMIM]PF$_6$-PEDOT:PSS/Bi$_2$S$_3$ cathode.

After 2000 cycles, the surface of the [EMIM]$PF_6$-PEDOT:PSS/$Bi_2S_3$ cathode is as uniform and smooth as that after 100 cycles proving that the cathode is robust enough to permit reversible expansion and contraction without any mechanical deficiencies (FIGS. 18A to 18C). In sharp contrast, the surface of the $Bi_2S_3$ cathode (i.e. in the absence of [EMIM]$PF_6$-PEDOT:PSS) became rough as the cycling numbers increases. As shown in FIGS. 18D to 18F, the $Bi_2S_3$ grains were pulverized and irregularly distributed on the electrode surface, and the integrity of the cathode was eventually lost owing to the increase of deep cracks on the cathode surface and the decrease of $Bi_2S_3$ grains.

Figure 19A:
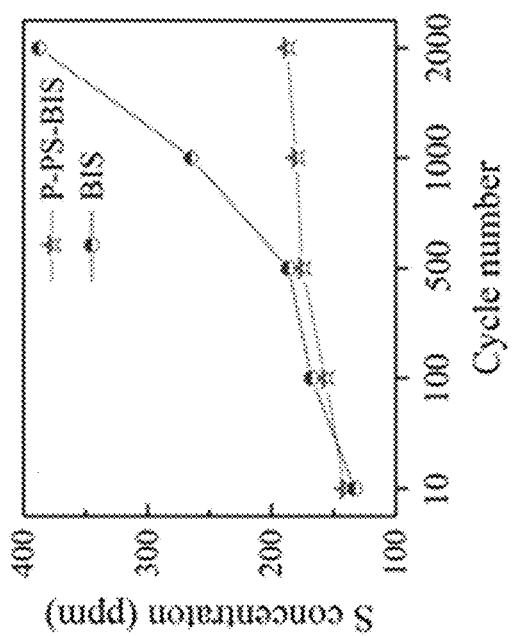
FIG. 19A is a plot of S concentration against cycle number showing the ICP analysis of dissolved S in an electrolyte of the Zn—Bi$_2$S$_3$ and the Zn-[EMIM]PF$_6$-PEDOT:PSS/Bi$_2$S$_3$ batteries at several cycle numbers.

The amount of dissolved S of the two comparative batteries at selected cycles were determined by ICP-AES (FIG. 19A). The Zn—$Bi_2S_3$ battery showed exponentially increased sulfur concentration in the electrolyte at the selected cycles. On the contrary, the S concentration in the electrolyte remained substantially stable for the Zn-[EMIM]$PF_6$-PEDOT:PSS/$Bi_2S_3$ battery at the selected cycles. These results indicated that the presence of the [EMIM]$PF_6$-PEDOT:PSS film can protect the $Bi_2S_3$ grains from collapse.

Figure 19B:
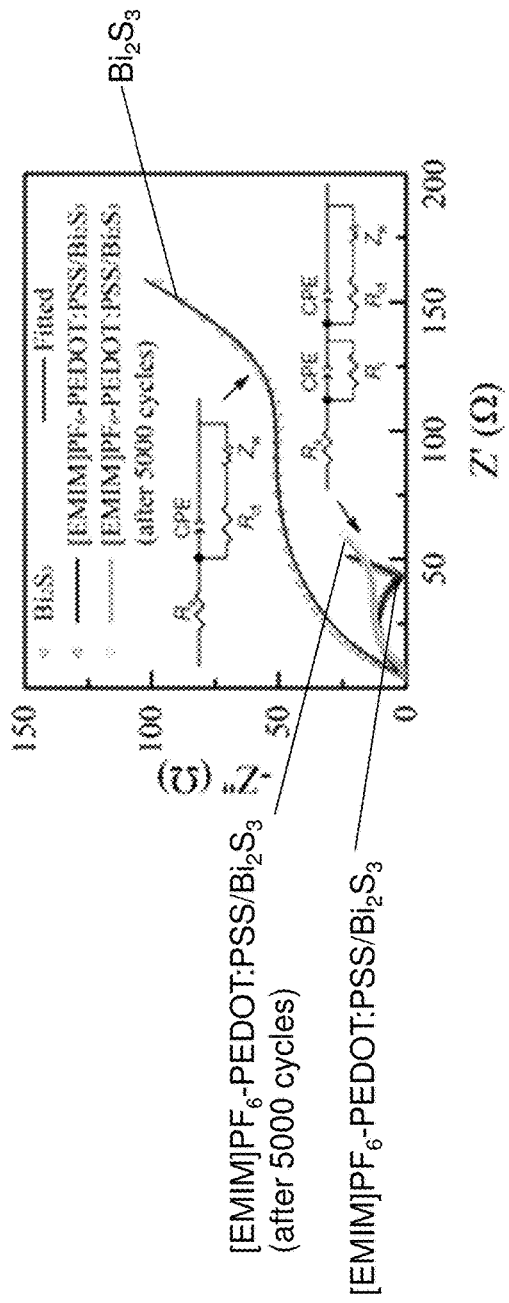
FIG. 19B is a plot showing the electrochemical impedance spectra analysis of the Zn—Bi$_2$S$_3$ and the Zn-[EMIM]PF$_6$-PEDOT:PSS/Bi$_2$S$_3$ batteries of FIG. 19A in the original state and after 5000 cycles. The insert shows the corresponding equivalent circuit fitting the EIS data.

The electrochemical impedance spectroscopy (EIS) measurements were performed to better understand the stable behavior of the Zn—$Bi_2S_3$ batteries with the [EMIM]$PF_6$-PEDOT:PSS film (FIG. 19B). The pristine Zn—$Bi_2S_3$ cell displayed an inclined line in the low-frequency related to mass transfer of $Zn^{2+}$ ions ($Z_w$) and the semicircle in the medium-frequency region due to the charge transfer process ($R_{ct}$) as fitted by equivalent circuit (1) in FIG. 19B. While the spectra collected for the Zn-[EMIM]$PF_6$-PEDOT:PSS/$Bi_2S_3$ battery before and after 5000 cycles consisted of two depressed semicircles at high frequency range followed by Warburg tail at low frequency as fitted by equivalent circuit (2), indicating the function of the artificial SEI (i.e. [EMIM]$PF_6$-PEDOT:PSS film) to stabilize the $Bi_2S_3$ cathode.

$R_{ct}$ of the Zn-[EMIM]$PF_6$-PEDOT:PSS/$Bi_2S_3$ battery after 5000 cycles was determined to be 36Ω, which is almost the same with that of the original state. In particular, both of the $R_{ct}$ values were much smaller than the $R_{ct}$ values of the original Zn—$Bi_2S_3$ battery (126Ω) owing to an electrochemical polishing of the artificial SEI film (i.e. the [EMIM]$PF_6$-PEDOT:PSS film), confirming the fast electrochemical reaction process. Moreover, the $Z_w$ values again indicated that the process is diffusion-controlled which is consistent with the CV analysis. Additionally much smaller values of $R_i$ (5.8Ω for pristine and 3.45Ω after 5000 cycles) also stands for much better wettability between the created interphase and electrolyte in Zn-[EMIM]$PF_6$-PEDOT:PSS/$Bi_2S_3$ battery.

Figure 20:
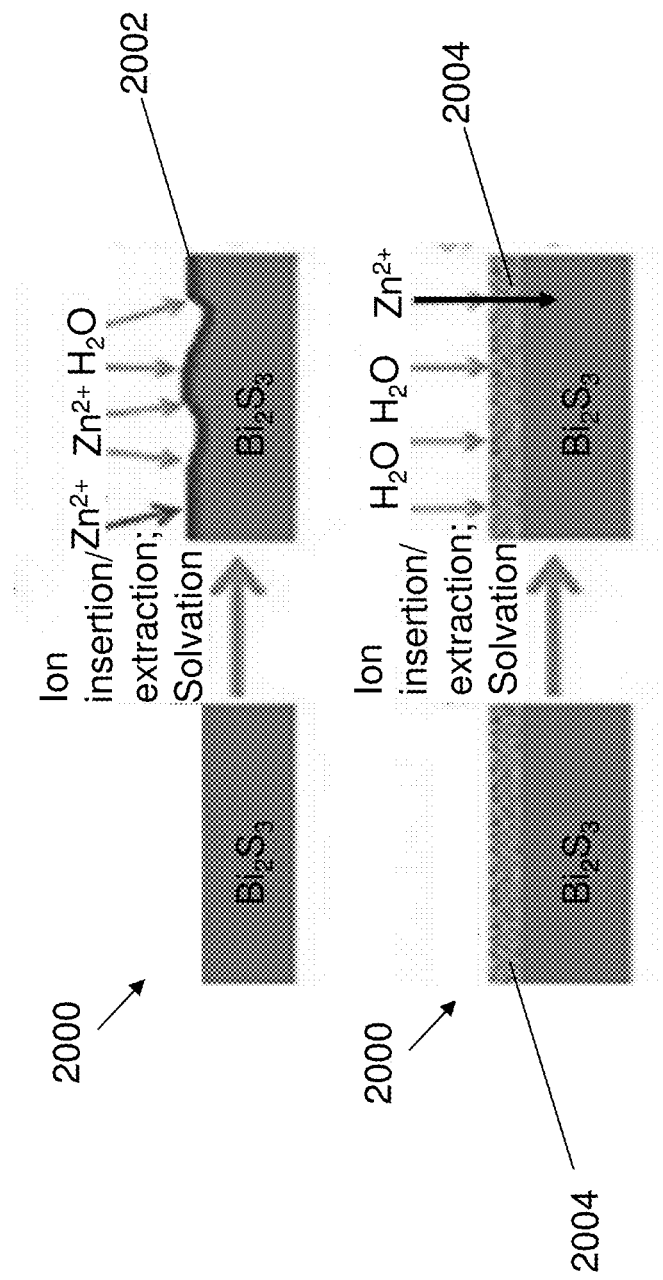
FIG. 20 is a schematic representation illustrating the Bi$_2$S$_3$ cathode structure in the presence and in the absence of the [EMIM]PF$_6$-PEDOT:PSS film in the original state and during cycling.

The effect of the artificial SEI layer (i.e. the [EMIM]$PF_6$-PEDOT:PSS layer) may be explained by the schematic illustration as shown in FIG. 20. In the absence of the [EMIM]$PF_6$-PEDOT:PSS layer, a SEI 2002 may form on and/or involve in the fractured surfaces of the $Bi_2S_3$ cathode 2000 through a dynamic breakage/repair mechanism, which may cause serious issues including cracking, comminution, and loss of $Bi_2S_3$ active materials, and inevitably leading to capacity decay. In contrast, when the [EMIM]$PF_6$-PEDOT:PSS layer 2004 is present on the surface of the active material (i.e. $Bi_2S_3$), the layer acts as an artificial SEI which prevents the active material from fracture and dissolution thereby maintaining the integrity of $Bi_2S_3$.

In summary, the [EMIM]$PF_6$-PEDOT:PSS film provides triple functions on battery performance: (i) the 3D porous architecture works as a buffer to efficiently accommodate the mechanical stress caused by volumetric expansion and pulverization of the active $Bi_2S_3$; (ii) the ultrahigh-conductivity channels of the film assisted by IL ascribed to the formation of distinct PEDOT- and PSS-rich domains that can facilitate $Zn^{2+}$ transport, rendering a rapid kinetics process; and (iii) functioning as an artificial SEI layer which exhibits high chemical stability without a destruction and regeneration mechanism.

Figure 21:
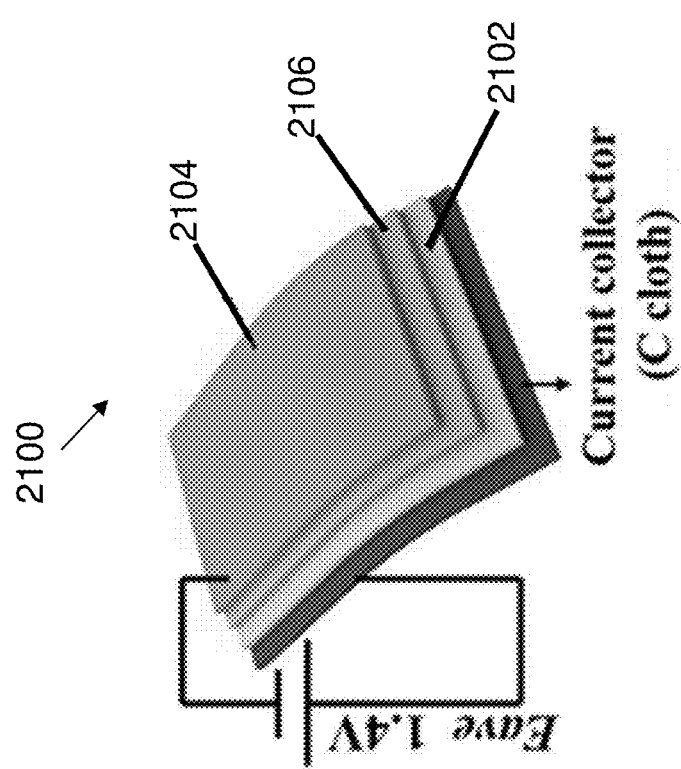
FIG. 21 is a schematic representation of a flexible Zn-[EMIM]PF$_6$-PEDOT:PSS/Bi$_2$S$_3$ battery.

The structure of the flexible quasi-solid Zn-[EMIM]$PF_6$-PEDOT:PSS/$Bi_2S_3$ battery 2100 is schematically illustrated in FIG. 21. The battery 2100 comprises a [EMIM]$PF_6$-PEDOT:PSS/$Bi_2S_3$ cathode 2102 disposed on carbon cloth, an electrodeposited Zn on carbon cloth as an anode 2104, and a PAM hydrogel electrolyte 2106 sandwiched between the electrodes 2102, 2104.

Figure 22A:
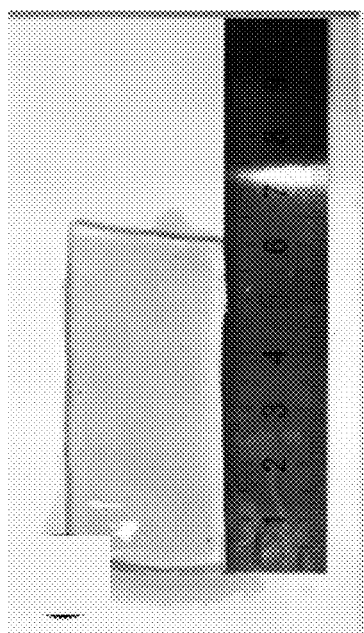
FIG. 22A is an optical image of a PAM hydrogel before being stretched.
Figure 22B:
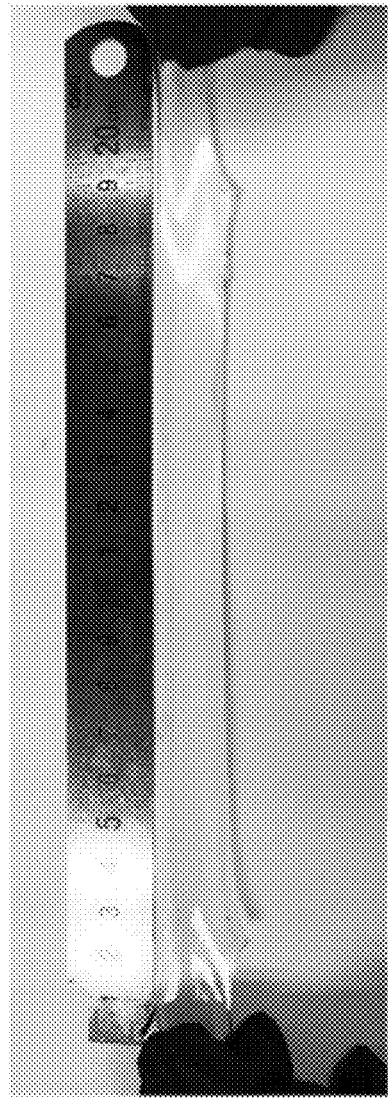
FIG. 22B is an optical image of the PAM hydrogel of FIG. 22A being stretched to 400% strain.
Figure 22C:
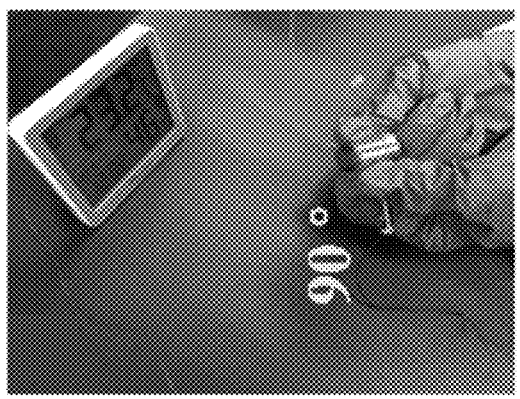
FIG. 22C is an optical image showing the battery of FIG. 21 being bent at 90° while powering a digital hygrometer thermometer.
Figure 22D:
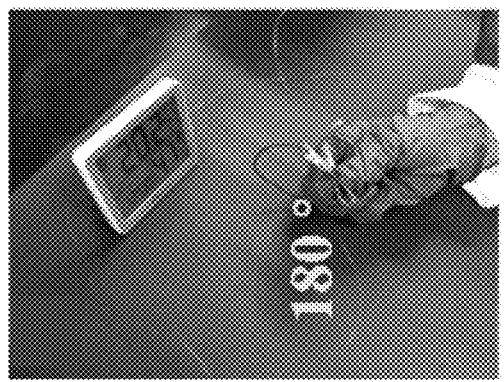
FIG. 22D is an optical image showing the battery of FIG. 21 being bent at 180° while powering the digital hygrometer thermometer.
Figure 23B:
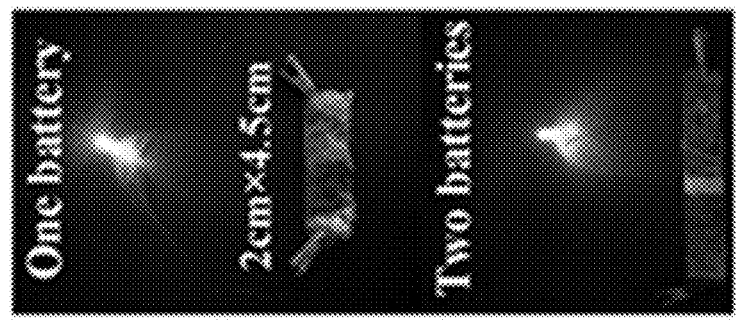
FIG. 23B is a pair of optical images showing a single or two batteries of FIG. 21 connected in series powering a yellow or a blue LED.
Figure 23A:
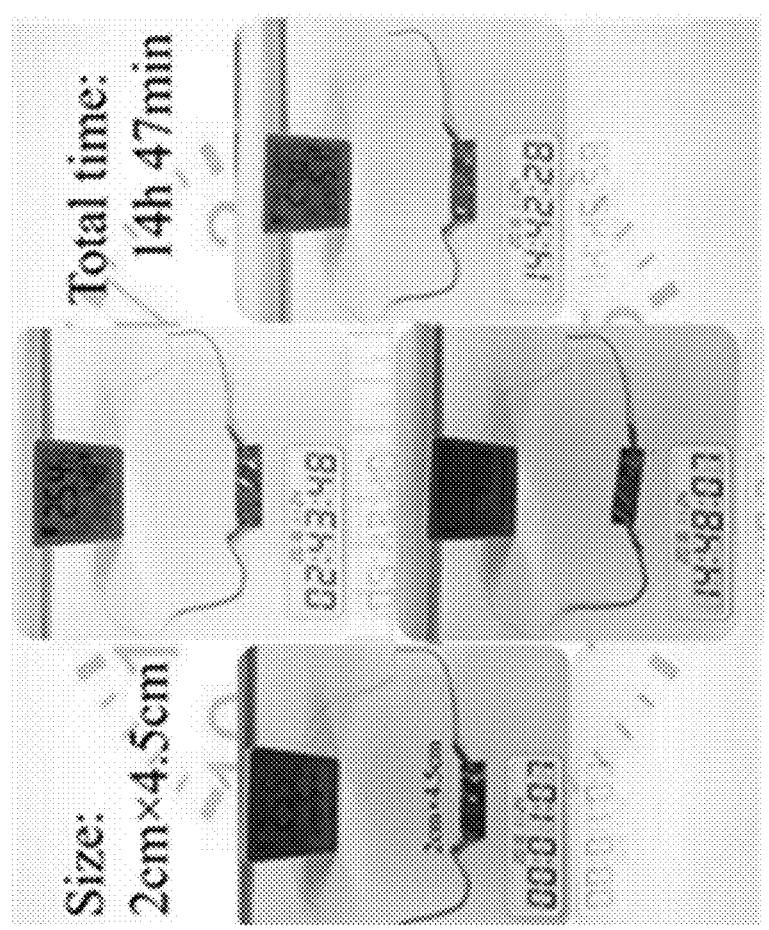
FIG. 23A is a series of optical images showing a single battery of FIG. 21 powering a 1.5 V digital hygrometer thermometer.

The PAM hydrogel is able to be stretched easily to 400% strain (FIGS. 22A and 22B). Such high flexibility renders the fabricated quasi-solid battery 2100 (2 cm×4.5 cm) being capable of lighting up a 1.5V digital hygrometer thermometer even under severely bending status (FIGS. 22C and 22D). In addition, the battery 2100 is able to power the digital hygrometer thermometer (1.5 V) for at least 14 h 48 min (FIG. 23A). The battery can also power a yellow LED, as well as a blue LED by two batteries connected in series (FIG. 23B). These results highlight the scalability and commercialization value of the battery of the present invention.

Figure 24A:
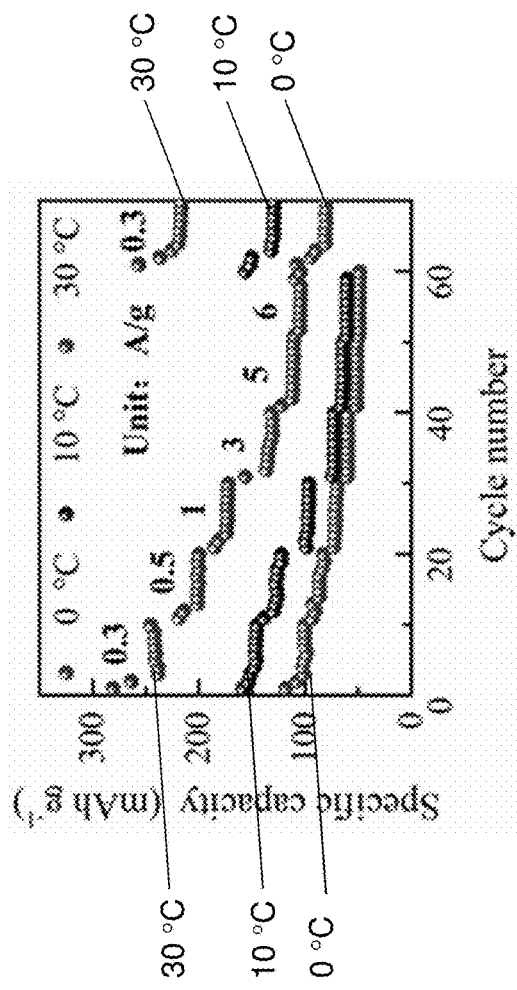
FIG. 24A is a plot of specific capacity against cycle number showing rate capability of the battery of FIG. 21 at 0, 10, or 30° C.

With reference to FIG. 24A, there is provided the rate testing results of the battery 2100 at different temperatures (T). As shown in FIG. 24A, the battery exhibited higher capacities at higher T at each rate, demonstrating a faster mass and charge transport. The discharge capacity of the battery remained reversible capacities at all tested T when increasing the current density from 0.3 to 6 A $g^{-1}$ in a stepwise manner and returning to 0.3 A $g^{-1}$. Particularly, the discharge capacities reached 101, 86, 73, 60, 53, 50 mAh $g^{-1}$, and then recovered to 84 mAh $g^{-1}$ even at 0° C., suggesting the potential for cryogenic applications of the battery.

Figure 24B:
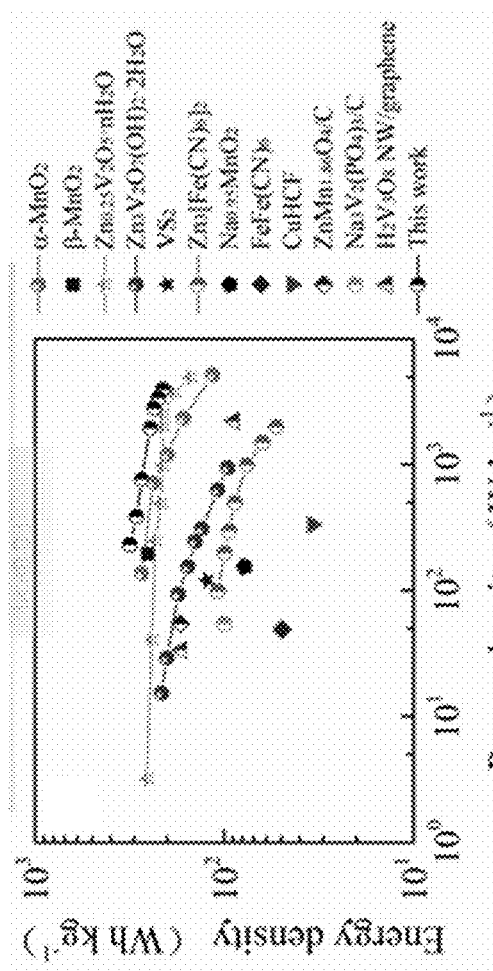
FIG. 24B is a Ragone plot of different ZIBs and the battery of FIG. 21.
Figure 25:
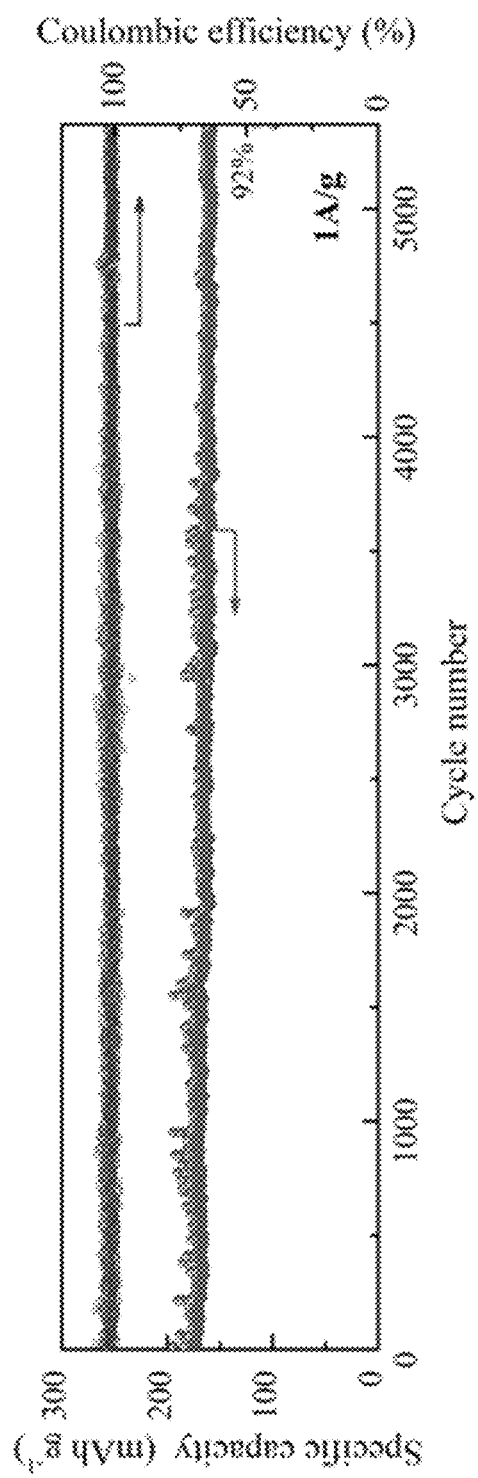
FIG. 25 is a plot showing the long-term cycling performance of the Zn-[EMIM]PF$_6$-PEDOT:PSS/Bi$_2$S$_3$ battery of FIG. 21 at 1 A g$^{-1}$.

The energy and power densities of the battery 2100 are compared with other aqueous ZIBs and the results are shown in FIG. 24B. The quasi-solid battery of the present invention can output a maximum energy density of 315 W h $kg^{-1}$ at a power density of 232 W $kg^{-1}$ in aqueous electrolyte. The overall performance is superior to some representative aqueous batteries based on Mn-based oxides, V-based oxides and sulfides, and prussian blue analogs, which is promising for large-scale energy storage device. In addition, the quasi-solid battery delivered a reversible capacity of 150 mAh $g^{-1}$ with a capacity retention of approximately 95% over 10000 cycles and CE approaching 100% in all cycles as illustrated in FIG. 25.

The energy storage device of the present invention such as the aforementioned Zn-[EMIM]$PF_6$-PEDOT:PSS/$Bi_2S_3$ battery is advantageous since it possesses excellent electrochemical properties. For example, the battery has a high reversible capacity of 274 mAh $g^{-1}$ at 0.3 A $g^{-1}$; a cycling stability of 95.3% capacity retention after 5000 cycles. The battery provides a long-powering capability such as powering a digital hygrometer thermometer for at least 14 h 48 min. In addition, the battery shows an at least 80% capacity retention upon operating the cycling process under 0° C., suggesting the potential use of the battery in cryogenic applications.

Furthermore, the scaling up of the device is very cost effective and simple as it does not require a water-free and/or oxygen-free environment for assembling the battery. The fabrication of the electrode particularly the cathode involves solution processes which are simple and environmentally friendly.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrode for an energy storage device, comprising:
   an active material including a material structure of metal sulfides;
   a conductive polymer including an ionic liquid disposed on the active material;
   wherein the combination of the conductive polymer and the ionic liquid maintains integrity of the material structure and facilitates ion transportation across the material structure during an operation of charging and discharging cycle of the energy storage device;
   wherein the conductive polymer includes a layer of PEDOT:PSS stacking onto the active material, the layer of PEDOT:PSS stabilizes the material structure during the operation; wherein the layer of PEDOT:PSS operates as a solid electrolyte interphase (SEI) between the material structure and an electrolyte of the energy storage device, thereby preventing the material structure from dissolving into the electrolyte; and wherein the layer of PEDOT:PSS includes a plurality of PEDOT chains and PSS chains interacting with the ionic liquid so as to provide a porous structure for increasing the ion transportation.

2. The electrode for an energy storage device according to claim 1, wherein the layer of PEDOT:PSS dissipates mechanical stress from a volume change of the material structure upon performing an insertion and/or extraction of the ions in the electrode, thereby preventing the material structure from collapsing.

3. The electrode for an energy storage device according to claim 1, wherein the plurality of PEDOT chains is partially isolated from the plurality of PSS chains thereby providing more channels for the ion transportation.

4. The electrode for an energy storage device according to claim 3, wherein the ionic liquid weakens the interactions between the PEDOT chains and the PSS chains thereby changing conformation of the chains to the channels.

5. The electrode for an energy storage device according to claim 4, wherein the ionic liquid includes 1-ethyl-3-methylimidazolium-hexafluorophosphate ([EMIM]$PF_6$).

6. The electrode for an energy storage device according to claim 1, wherein the active material includes bismuth sulfide ($Bi_2S_3$).

7. The electrode for an energy storage device according to claim 1, wherein the active material is disposed on a substrate.

8. The electrode for an energy storage device according to claim 7, wherein the substrate includes carbon cloth.

9. An energy storage device, comprising:
   a first electrode;
   a second electrode in accordance with claim 1; and
   an electrolyte including an aqueous electrolytic solution disposed between the first and the second electrodes.

10. The energy storage device according to claim 9, wherein the electrolyte includes a hydrogel containing a high concentration salt solution.

11. The energy storage device according to claim 10, wherein the electrolyte includes the hydrogel of polyacrylamide containing at least one salt with a concentration of 1-21 mol $kg^{-1}$.

12. The energy storage device according to claim 9, wherein the first electrode is an anode including zinc.

13. The energy storage device according to claim 12, wherein the zinc metal is electrodeposited on a substrate.

14. The energy storage device according to claim 13, wherein the substrate includes carbon cloth.

15. The energy storage device according to claim 10, wherein the hydrogel is flexible such that the device is arranged to be operable upon subjecting to a bending condition.

16. The energy storage device according to claim 10, wherein the high concentration of salt reduces freezing point of the electrolyte such that the device is arranged to maintain its capacity reversibility under a low temperature condition.

17. The energy storage device according to claim 9, wherein the device is a rechargeable battery.

* * * * *